US008413856B2

(12) United States Patent
Williams et al.

(10) Patent No.: US 8,413,856 B2
(45) Date of Patent: Apr. 9, 2013

(54) PORTABLE CONSTANT-PRESSURE REFILLABLE MATERIAL TRANSFER SYSTEM

(75) Inventors: Eric A. Williams, Ojai, CA (US); Robert D. Thibodeau, Oxnard, CA (US); Michael P. Nicholls, Ventura, CA (US)

(73) Assignee: CH&I Technologies, Inc., Santa Paula, CA (US)

( * ) Notice: Subject to any disclaimer, the term of this patent is extended or adjusted under 35 U.S.C. 154(b) by 987 days.

(21) Appl. No.: 12/426,789

(22) Filed: Apr. 20, 2009

(65) Prior Publication Data

US 2009/0261128 A1 Oct. 22, 2009

Related U.S. Application Data

(60) Provisional application No. 61/124,913, filed on Apr. 21, 2008.

(51) Int. Cl.
*B67D 7/60* (2010.01)
*B65D 83/00* (2006.01)

(52) U.S. Cl. .......................... 222/389; 222/399; 222/394

(58) Field of Classification Search .................. 222/389, 222/399, 394, 390, 386, 333, 444, 61, 64, 222/51; 73/305, 319, 322, 314, 313
See application file for complete search history.

(56) References Cited

U.S. PATENT DOCUMENTS

| 2,057,800 | A | * | 10/1936 | Strelow ..................... 137/505.46 |
|---|---|---|---|---|
| 2,465,628 | A | * | 3/1949 | Border ............................. 73/438 |
| 2,745,575 | A | | 5/1956 | Spencer |
| 2,995,139 | A | * | 8/1961 | Remke et al. ..................... 137/2 |
| 3,042,268 | A | | 7/1962 | Plyes |
| 3,164,303 | A | | 1/1965 | Trautmann |
| 3,182,406 | A | * | 5/1965 | Loewen ........................... 34/519 |
| 3,253,592 | A | | 5/1966 | von Pechmann |
| 3,873,007 | A | | 3/1975 | Christine et al. |
| 4,298,575 | A | | 11/1981 | Berglund |
| 4,323,176 | A | | 4/1982 | Sartain |
| 4,355,736 | A | | 10/1982 | Schumacker et al. |
| 4,445,629 | A | | 5/1984 | Doerfler |
| 4,498,318 | A | | 2/1985 | Mitter |

(Continued)

FOREIGN PATENT DOCUMENTS

| EP | 0812801 A1 | 12/1997 |
|---|---|---|
| EP | 0839758 | 5/1998 |

(Continued)

OTHER PUBLICATIONS

PCT International Search Report and Written Opinion, PCT/US2006/041193, Sep. 17, 2007.

(Continued)

*Primary Examiner* — Kevin P Shaver
*Assistant Examiner* — Stephanie E Williams
(74) *Attorney, Agent, or Firm* — Fulwider Patton LLP

(57) ABSTRACT

A refillable material transfer system is disclosed having a portable constant-pressure compressed gas system for storing, transferring and dispensing viscous material, such as fluids and liquids, includes a material containment vessel with an upper region incorporating a motive force and a bottom region with a material ingress and egress opening. The portable constant-pressure compressed gas subsystem can be used with a fluid vessel, hand-held systems, a backpack system or other configurations.

9 Claims, 13 Drawing Sheets

U.S. PATENT DOCUMENTS

| | | |
|---|---|---|
| 4,526,295 A | 7/1985 | Morel et al. |
| 4,545,504 A | 10/1985 | Fabel et al. |
| 4,548,342 A | 10/1985 | Fisher |
| 4,783,366 A | 11/1988 | Shimogo et al. |
| 4,854,485 A | 8/1989 | Collins |
| 4,936,493 A | 6/1990 | Foster et al. |
| 5,360,146 A | 11/1994 | Ikushima |
| 5,373,221 A | 12/1994 | McGee et al. |
| 5,418,040 A | 5/1995 | Kaneko et al. |
| 5,419,466 A | 5/1995 | Scheindel |
| 5,435,468 A | 7/1995 | Clark, II |
| 5,524,797 A | 6/1996 | Schultz, Sr. |
| 5,707,234 A | 1/1998 | Bender |
| 5,833,119 A | 11/1998 | Kolacek |
| 6,253,799 B1 | 7/2001 | Guzowski et al. |
| 6,319,532 B1 | 11/2001 | Pineault |
| 6,364,218 B1 | 4/2002 | Tudor et al. |
| 6,488,651 B1 | 12/2002 | Morris et al. |
| 6,540,105 B2 | 4/2003 | Dorman et al. |
| 6,602,492 B2 | 8/2003 | Iwasaki et al. |
| 6,726,773 B1 | 4/2004 | Yanagita et al. |
| 6,814,310 B2 | 11/2004 | Boger |
| 6,834,689 B1 | 12/2004 | Peters |
| 6,840,404 B1 | 1/2005 | Schultz et al. |
| 6,861,100 B1 | 3/2005 | Schucker |
| 6,916,025 B2 | 7/2005 | Brisson |
| 6,975,966 B2 | 12/2005 | Scott et al. |
| 2002/0117512 A1 | 8/2002 | Earle et al. |
| 2003/0071082 A1 | 4/2003 | Johnson |
| 2004/0069813 A1 | 4/2004 | Brisson |
| 2005/0232072 A1 | 10/2005 | Thibodeau et al. |
| 2007/0090132 A1* | 4/2007 | Williams et al. .............. 222/389 |

FOREIGN PATENT DOCUMENTS

| | | |
|---|---|---|
| FR | 2701253 A1 | 8/1994 |
| FR | 2789059 A1 | 8/2000 |
| WO | 2005/097666 A | 10/2005 |

OTHER PUBLICATIONS

PCT International Search Report and Written Opinion, PCT/US2005/011007, Jul. 27, 2005.

* cited by examiner

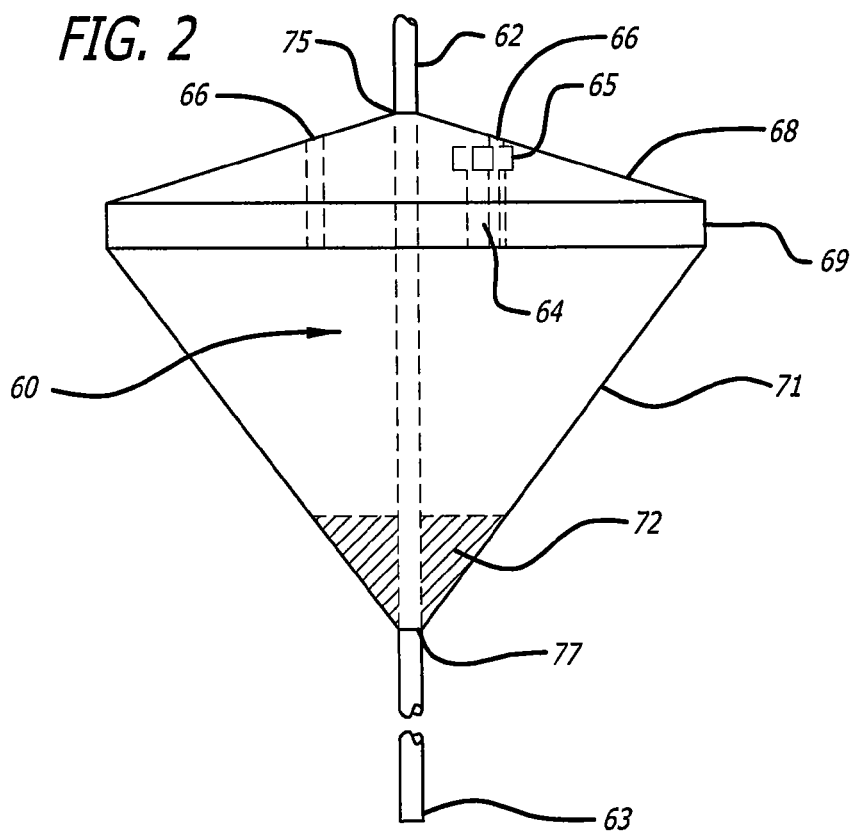
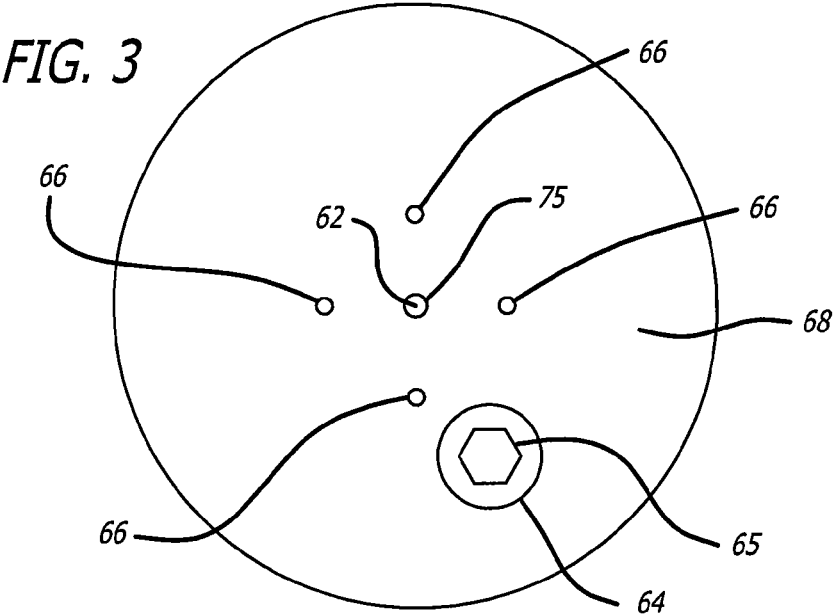

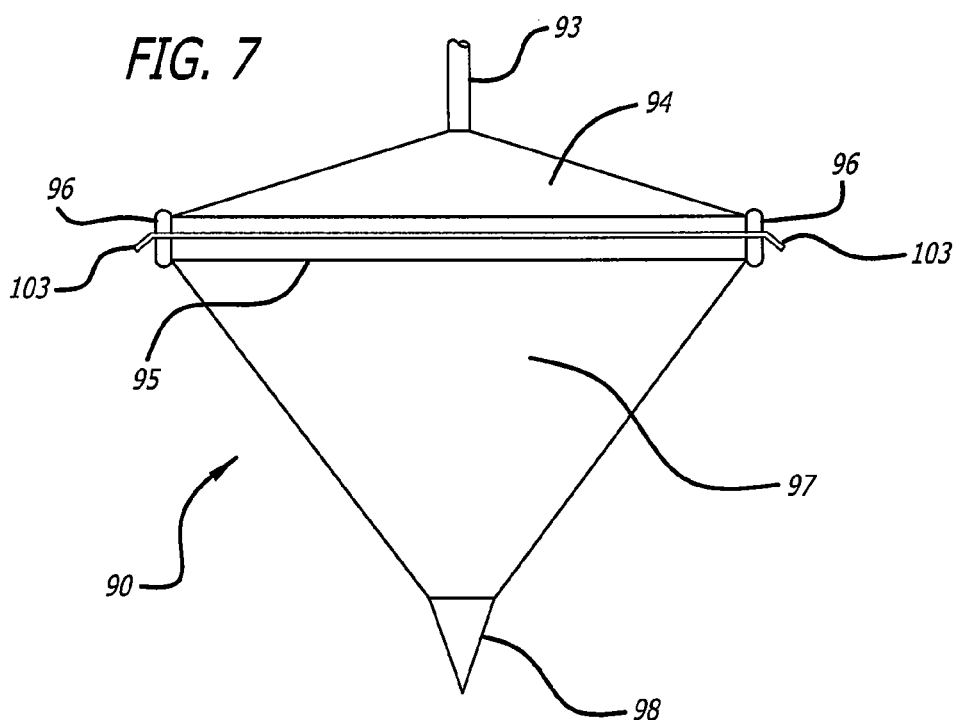
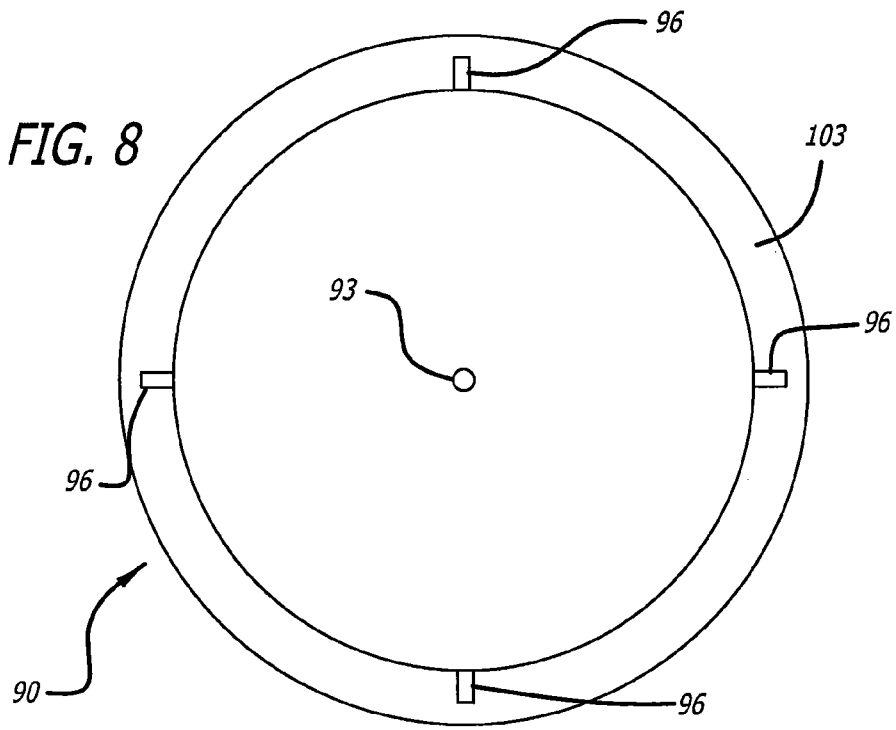

PORTABLE CONSTANT-PRESSURE REFILLABLE MATERIAL TRANSFER SYSTEM

CROSS REFERENCE TO RELATED APPLICATIONS

This patent application claims priority from U.S. Provisional Patent Application No. 61/124,913, filed Apr. 21, 2008, the contents of which are fully incorporated herein by reference.

BACKGROUND OF THE INVENTION

The present invention relates to the field of materials management, and more particularly to systems designed for containing, transferring, delivering and dispensing various materials. The present invention is more particularly directed to a refillable material transfer system having a constant-pressure portable pressurization sub-system.

Prior known material management systems have encountered difficulty transferring from a containment vessel certain thick, viscous fluids, liquids and other types of materials that may resist pumping and that can be damaging to pumping apparatus. As used herein, a fluid is a substance that is capable of flowing and that changes its shape at a steady rate when acted upon by a force tending to change its shape. Certain materials, while normally not considered to be fluids, also can be made to flow under certain conditions, for example, soft solids and semi-solids. Vast quantities of fluids are used in transportation, manufacturing, farming, mining, and industry. Thick fluids, viscous fluids, semi-solid fluids, visco-elastic products, pastes, gels and other fluid materials that are not easy to dispense from fluid sources (for example, pressure vessels, open containers, supply lines, etc.) comprise a sizable portion of the fluids utilized. These fluids include thick and/or viscous chemicals and other such materials, for example, lubricating greases, adhesives, sealants and mastics. In the food processing industry, cheeses, creams, food pastes and the like must be moved from point to point without degrading the food's quality and freshness. In the manufacture and use of industrial chemicals and pharmaceutical products, hard to move fluids that are thick and/or viscous are commonly used. The ability to transport these materials from one place to another, for example, from a container to a manufacturing or processing site, and in a manner that protects the quality of the material, is of vital importance.

Transporting, handling, delivering and dispensing thick and/or viscous materials presents a challenge because these materials resist flowing and are not easily dispensed or moved out of their containers. Prior known methods of delivering viscous fluids have concentrated on establishing and maintaining a fluid tight seal between pushing pistons or follower plates, and side walls of the containers of viscous materials. These devices, however, are highly susceptible to disruption if the sidewalls of the viscous material container become out-of-round or dented. Moreover, some systems require high precision in all its parts, and require relatively bulky and expensive equipment. Furthermore, most known systems for material transport of fluids require the use of an external pump with a container having a follower plate. Moreover, the pump and follower plate are connected or otherwise coupled so as to increase the expense and mechanical sophistication of such material transfer systems.

Heretofore known vessels and containers were basic moderate-high-pressure vessels having characteristics that were deficient in transferring difficult to move materials. For example, such vessels often were relatively heavy, mild steel, converted air receivers. Other such vessels were merely thin-walled, special steel alloy, converted propane tanks. Accordingly, the vessels were manufactured under DOT regulations, and therefore required relatively frequent re-certification. Such containers also were susceptible to internal rusting, and often were closed, and therefore difficult to clean. Furthermore, the containers were not bimodal (for liquids and/or thick fluids). In addition, past container internals consisted of only one internal subsystem, a follower device that had a single function, to prevent high-pressure gas bypassing. These follower devices were difficult to fabricate, relatively expensive, rust-prone and could not wipe the vessel walls, even if desired by the user. Many such systems contained heavy "ballast" that was not modifiable after fabrication and were easily canted (tipped) if container was placed on its side.

One disclosed reusable viscous material dispensing apparatus system includes a follower boat having a lower hull portion that is weighted with ballast. The diameter of the boat is smaller than the inner diameter of the cylinder, such that the boat floats in a cylinder filled with viscous materials, such as thick lubricating greases. In use of the system, the cylinder is filled with a viscous material through its ingress and egress opening. By applying compressed gas to the boat from above, the boat attempts to force the viscous material out of the container through a common ingress and egress opening, until the bottom of the boat seats on and blocks the opening. However, the disclosed container is configured as a vertical, closed, pressure vessel that may be difficult to clean. Moreover, the disclosed boat is a single-function (prevents gas bypass), heavy, difficult to manufacture apparatus.

Accordingly, there is a need for, and what was heretofore unavailable, a refillable material transfer system having a portable constant-pressure compressed gas subsystem that can move highly viscous fluids from a vessel to a point of use. Similarly, there is a need for a material transfer system that will dispense only the required amount of material without waste, which is especially important when chemicals are not easily handled and cannot be manually removed easily or safely from the vessel. Preferably, such a material transfer system would reduce or eliminate costs and expenses attendant to using drums, kegs and pails, as well as the waste of material associated with most existing systems. Because certain chemicals are sensitive to contamination of one form or another, there is a further need for a material transfer system that is sealed, protects product quality, allows sampling without opening the container to contamination and permits proper attribution of product quality problems to either the supplier or the user. Likewise, there is need for a refillable material transfer system that uses low cost components and provides a non-mechanical (no moving parts), non-pulsating solution for dispensing and transferring thick fluids and other such materials. The present invention satisfies these and other needs.

SUMMARY OF THE INVENTION

Briefly, and in general terms, the present invention is directed to a refillable material transfer system ("RMTS") having a portable constant-pressure compressed gas system for dispensing various materials, including thick, viscous and other types of fluids that resist pumping and/or which might be damaging to pumping apparatus. The invention further provides a material management system adapted for delivery of contamination-free streams of fluid product, which can be emptied and refilled repeatedly without intervening cleaning of the apparatus. In another aspect, the invention further provides a material management system adapted to dispense thick, stiff, and/or viscous materials that resist flowing without the need for a separate pump or the need to couple a pump to a follower plate in the container. In a further aspect, the invention provides a material management system adapted to provide information to users as to how much fluid remains in the container. In yet another aspect, the invention provides a fluid management system adapted to deliver high fluid flow rates within a greater operational temperature range.

The portable constant-pressure compressed gas system of the present invention significantly decreases the cost and space requirements, and significantly improves the ergonomics for the RMTS. This decreased cost is based on using less expensive and more readily available consumer liquefied compressed gas containers, instead of more expensive and less readily available commercial and industrial non-liquified compressed gas cylinders. This decreased space requirement is based on using higher mass-capacity liquefied compressed gas containers, instead of lower mass-capacity non-liquified compressed gas containers. These improved ergonomics are based on using smaller and lighter liquefied compressed gas containers, instead of larger and heavier non-liquified compressed gas containers.

The portable constant-pressure compressed gas subsystem for a RMTS may be used with a fluid vessel, hand-held systems, a backpack system or other configurations. The application may be for fluid systems such as, but not limited to, oils, greases, mastics, glues, highly viscous fluids, abrasive fluids, semi-solids and visco-elastic solids.

The present invention is a reusable, refillable, and recyclable system useful in packaging, storing, transferring, and dispensing viscous material, such as fluids and liquids. The system includes a material containment vessel with an upper region incorporating a motive force, and a bottom region with a material ingress and egress opening. Alternatively, the material ingress and egress may be configured in a manifold or other structure positioned at the top of the vessel. A diconical or other shaped, level-instrumented force transfer device is located in the material containment area. The force transfer device can be weighted to an amount depending upon the application. The diameter and height of the tangential element of the force transfer device forms a cylindrical interface region. The diameter of this cylindrical interface region is smaller than the inner diameter of the material container forming an annulus that is matched to the viscous fluid or liquid and to the operating conditions of the system.

The force transfer device is an energy transducer when the material containment is filled with highly viscous materials, such as adhesives, sealants, mastics or lubricating greases. The force transfer device may serve as an integral part of a level indicator for both viscous fluids and lower viscosity liquids. The viscous material itself forms a seal between the interface region of the force transfer device and the inside wall of the fluid vessel. Vertical stabilizing elements may extend outward from the force transfer device. These stabilizing elements prevent the interface region from scraping viscous materials off the sidewalls of the fluid containment. In the use of the system, the vessel is filled with a material, such as a viscous fluid or a liquid through its ingress and egress opening. The filling operation raises the force transfer device and forms a viscous seal. By applying pressure to the force transfer device from above, the force transfer device forces the viscous material out of the vessel through the material ingress and egress opening, until the bottom of the force transfer device seats on and blocks the ingress and egress opening. In the present invention, energy in the form of high-pressure inert gas may be applied to the force transfer device. As also contemplated by the present invention, the energy may be derived from a combination of pneumatic, hydraulic, mechanical, electronic, or electro-mechanical means, wherein no sealing devices are used between the force transfer device and the vessel wall.

The present invention includes an apparatus for transferring material from a vessel including a crown, a tangential member attached to the crown, wherein the tangential member is configured with an outer surface substantially parallel to the longitudinal axis, and a thruster attached to the tangential member, wherein the thruster is configured with a portion for penetrating a material. The force transfer device may be configured such that thruster is cone shaped including a vertex directed away from the tangential member, the crown is cone shaped with a vertex directed away from the tangential member, and the tangential member includes one or more cylindrical shaped disks or plates. Alternatively, the force transfer device may be configured with a semi-elliptical shape having a cylindrical shaped protuberance. The force transfer device may further be configured with stabilizing fins connected to an outer surface of the tangential member or connected to an outer surface of the crown. Additionally, the force transfer device may include a level indicating device incorporating a stem having a plurality of magnetic reed switches, wherein the stem is slidably disposed within the crown, tangential member and thruster, and a magnetic actuator is disposed within a bottom portion of the thruster.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 2 is a side plan view of the force transfer device of FIG. 1.

FIG. 3 is a top plan view of the force transfer device of FIG. 2.

FIG. 7 is a side plan view of the force transfer device of FIG. 5, further including an annulus management device.

FIG. 8 is a top plan view of the force transfer device of FIG. 7.

DETAILED DESCRIPTION OF THE INVENTION

Figure 1:
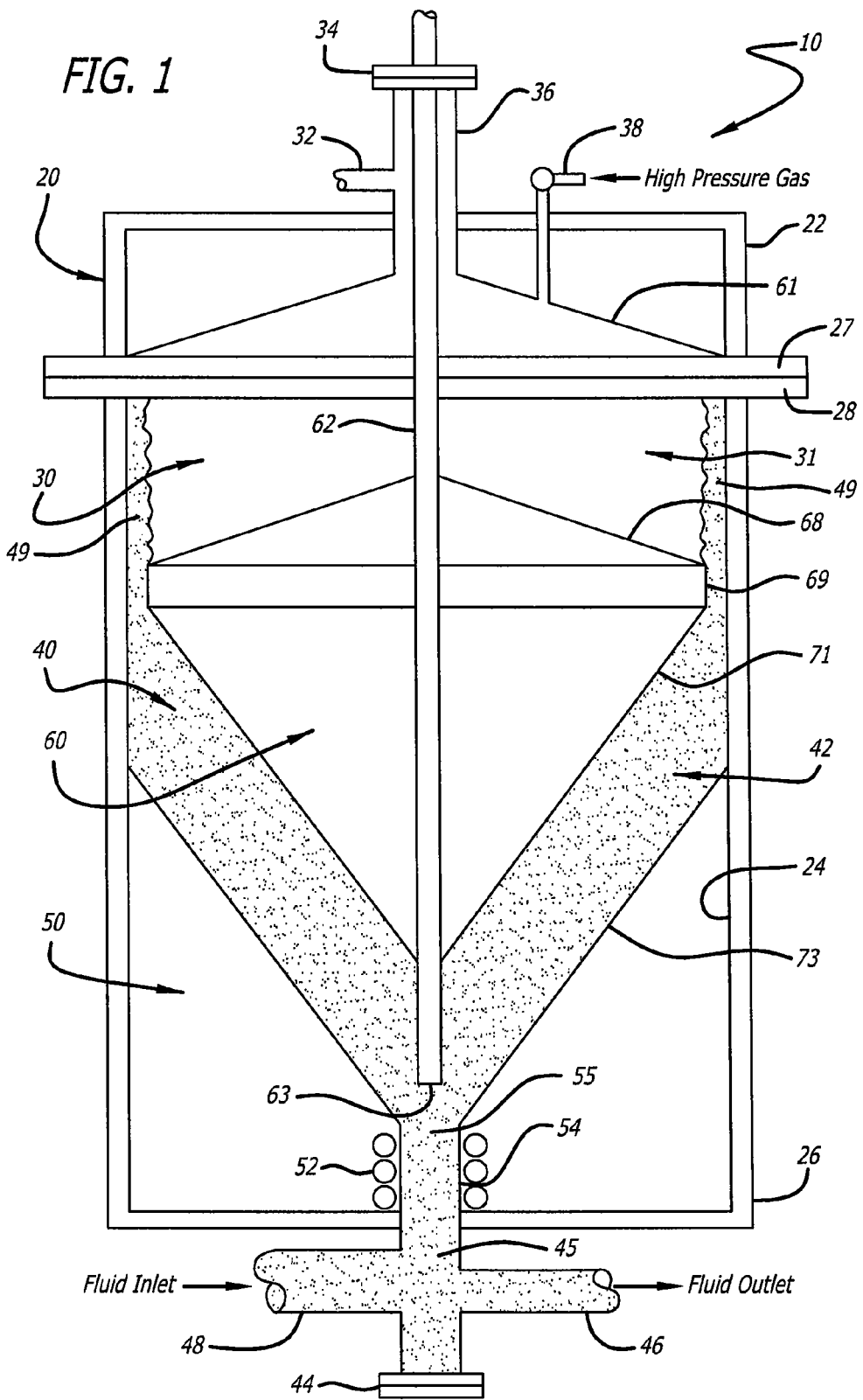
FIG. 1 is a front plan view in partial cross-section of a first embodiment of the refillable material transfer system of the present invention having a diconical force transfer device.

As shown in the drawings for purposes of illustration, the present invention is directed to refillable material transfer systems for dispensing various materials, including thick, viscous and other types of fluids that resist pumping and/or which might be damaging to pumping apparatus. The system includes a material containment vessel with an upper region incorporating a motive force, and a bottom region with a material ingress and egress opening. A diconical or other shaped, level-instrumented force transfer device is located in the material containment area. The force transfer device can be weighted to an amount depending upon the application. The diameter and height of the tangential element of the force transfer device forms a cylindrical interface region. The diameter of this cylindrical interface region is smaller than the inner diameter of the material container forming an annulus that is matched to the viscous fluid or liquid and to the operating conditions of the system.

The portable constant-pressure compressed gas subsystem of the present invention significantly decreases the cost and space requirements, and significantly improves the ergonomics of the RMTS. This decreased cost is based on using less expensive and more readily available consumer liquefied compressed gas containers, instead of more expensive and less readily available commercial and industrial non-liquified compressed gas cylinders. This decreased space requirement is based on using higher mass-capacity liquefied compressed gas containers, instead of lower mass-capacity non-liquified compressed gas containers. These improved ergonomics are based on using smaller and lighter liquefied compressed gas containers, instead of larger and heavier non-liquified compressed gas containers.

The portable constant-pressure compressed gas subsystem for a RMTS may be used with a fluid vessel, hand-held systems, a backpack system or other configurations. The application may be for fluid systems such as, but not limited to, oils, greases, mastics, glues, highly viscous fluids, abrasive fluids, semi-solids and visco-elastic solids.

Known portable constant-pressure compressed gas subsystems suitable with the present invention include, but are not limited to:

---

Kobalt #J-6901-100 Portable Compressed $CO_2$ Regulator (typically used for air/pneumatic tools):
http://www.lowes.com/lowes/lkn?action=productDetail&productId=166441-61735-J-6901-100
JacPac ® #J-6901-91 Regulator Kit (typically used for air/pneumatic tools):
http://www.jacpacco2.com/content/moduleId/F14Tgzil/product/MsrMvuMc.html
https://www.mytoolplace.com/JacPac-Portable-Compressed-CO2-Pneumatic-Regulator-Kit---J-6901-91-P1204C1674.aspx?UserID=268355&SessionID=G8U6CK4BoCbTWWVGpszZ
Blue Rhino ® Rhino Power 9 and 20 ounce $CO_2$ cylinders (typically used for paintball, and air/pneumatic tools):
http://ww2.bluerhino.com/rhinopower/index.html
Red Sea $CO_2$ Pro System (typically used for "planted" aquariums):
http://www.redseafish.com/co2_pro.asp
Sports Marketing $CO_2$ Power Adapter (typically used for air guns, $CO_2$ guns, and paintball):
http://www.sportsmk.co.uk/item/479/
Palmer's Pursuit Shop custom regulator assembly for 12 gram $CO_2$ cartridges (typically used for air guns, $CO_2$ guns, and paintball), consisting of:
Stabilizer: http://www.palmer-pursuit.com/cart/index.php?main_page=product_info&products_id=824
Adapter: http://www.palmer-pursuit.com/cart/index.php?main_page=product_info&products_id=185
Knob: http://www.palmer-pursuit.com/cart/index.php?main_page=product_info&products_id=50
Gage: http://www.palmer-pursuit.com/cart/index.php?main_page=product_info&products_id=70
Crosman ® Powerlet ® 12 gram $CO_2$ cartridges (typically used for air guns, $CO_2$ guns, and paintball):
http://www.crosman.com/site/catalog/powerlets
Daisy ® Powerline ® 12 gram $CO_2$ cartridges (typically used for air guns, $CO_2$ guns, and paintball):
http://www.daisy.com/shopping/customer/product.php?productid=16164&cat=263&page=1
Brass Eagle ® 12 and 90 gram; and 9, 12, 14, 20, and 24 ounce $CO_2$ cylinders (typically used for paintball):
http://www.brasseagle.com/products/product_detail2.asp?cat=Eagle+Air+Syste
Micro Matic $CO_2$ (typically used for draft beer):
2.5, 5, 10, 15, and 20 pound cylinders:
http://www.micromatic.com/draft-keg-beer/gas-equipment-cid-19.html

---

Pressure Regulators:

--- http://www.micromatic.com/draft-keg-beer/regulators-cid-17.html
Kidde $CO_2$ fire extinguishers.
http://www.kiddefiresystems.com/utcfs/ws-383/Assets/k-88-005_print.pdf

---

Turning now to the drawings, in which like reference numerals represent like or corresponding aspects of the drawings, and with particular reference to FIG. 1, the refillable material transfer system 10 includes a pressure vessel 20 and a force transfer device 60, having a crown (upper portion) 68 and a thruster (lower portion) 71. The pressure vessel includes a top portion (first end) 22, a sidewall 24 and a bottom portion (second end) 26. The pressure vessel may be in the form of a cylindrical container or other suitable shape for containing the material to be moved in and out of the pressure vessel. For example, the container may be a vertical or horizontal high-pressure vessel, a single pipe, a pipe cluster or a pipe-spool. Furthermore, the container need not necessarily be configured for or as a pressure vessel, wherein the material to be transferred in and out of the container may move with gravity or other energy or force applied to the transfer device. Suitable materials of construction for the material vessel and its components include metals (such as aluminum, copper, iron, nickel and titanium) and alloys (such as alloy 20, inconel, monel, steel and stainless steel). In addition, polymers, plastics, composites and other synthetic materials (such as fiber reinforced plastic, polyethylene, PET (polyethylene terephthalate) polypropylene, polytetrafluoroethylene, polyurethane, polyvinyl chloride, acrylonitrile butadiene styrene—ABS, chlorinated polyvinyl chloride—CPVC and polyvinylidene fluoride—PVDF) may be used to construct the container and its components. Wherein the present invention contemplates horizontal, vertical and tilted vessels, the references to the drawings herein are generally to a vertical vessel; however, those of ordinary skill in the art will appreciate that terms such as upper, lower, top and bottom may be easily translated to horizontal and tilted configurations of the refillable material transfer system.

The top 22 of the vessel 20 may be secured to the sidewall or may be an openable lid or otherwise removable from the sidewall portion 24 of the vessel. The top of the vessel may have a flat surface, a semi-ellipsoidal surface, or a hemispherical surface. The top may be configured as a lid that can be opened to facilitate the removal of the force transfer device 60, changing of material service, maintenance of the systems internals and periodic cleaning. The lid of the vessel may include an access manifold 36 that extends outward from the top of the vessel and extends into the lid. The access manifold is preferably centrally positioned, for example, along the longitudinal axis of the vessel. The access manifold may include an overflow arm 32 or other device for allowing excess material to exit the container during a filling operation. The overflow arm may include a manually operated or pressure-release valve. The access manifold may further be configured to contain a stabilizer pipe or other rod to be disposed within the container along its longitudinal axis. An access flange 34 may be fitted at the outside end of the access pipe (external of the vessel) so as to constrain a stabilizer rod (pipe) 62 that may extend from the top of the vessel to proximate the bottom 26 of the vessel. The top of the container may be further configured with a valve and fitting 38 for introducing and/or releasing pressurized gas into/from the vessel. Gases such as air, nitrogen or other chemically derived gases (inert or active) may be employed to pressurize the vessel and provide an applied force to the crown 68. In addition, the lid may be configured with a pressure release valve (not shown) or other device to relieve overpressure of gas within the container. The access flange may also be used for relief of the pressurized gas from the vessel.

The top 22 of the container 20 may be further configured with a retainer 61 for restraining the force transfer device 60 as it reaches the top of the container. The retainer serves at least two purposes: to prevent overflow during refilling operations, and to facilitate the removal of any of any materials retained on the upper surface of the conical crown 68, especially semi-solid materials, by allowing them to be expelled during a fill cycle. The retainer may be formed to conform to the shape of the crown of the force transfer device. The retainer may be made from of the same or different metal, alloy or polymer as the material vessel, depending upon the construction of the vessel, force transfer device and material serviced. Additionally, the top of the container and sidewall portion of the container may be configured with flanges that fit tightly together so as to form a seal when the container is configured with an openable top. A first flange 27 could be secured to the top of the vessel, wherein a second flange 28 is secured to the sidewall of the vessel. Fastening mechanisms (not shown) may be used to secure the top flange and sidewall flange together when the container is in operation.

The sidewall 24 of the vessel 20 defines a gas space 30 within the vessel. Similarly, when the vessel is filled with material 42 a portion of the container includes a material space 40. The vessel may further include a false bottom portion 50 that is defined by an arrestor 73 configured to match (conform to) the shape of the thruster 71 of the force transfer device. The vessel's bottom may have a flat surface, a semi-ellipsoidal surface, a hemispherical surface or other suitable shape for the duty of the vessel. The arrestor is configured to prevent gas bypassing and to assure low material retain when the vessel is empty. The arrestor may be further configured with an outlet channel 55 that transverses the bottom 26 of the vessel and is in fluid communication with a material manifold 45. Preferably, the outlet channel is of sufficient length so as to prevent gas flow into the material manifold by sealing the exit with abundant material. In addition, the outlet channel may be of sufficient length to define a heat transfer area 54 such that heat transfer elements 52 may be interposed around the outlet channel and under the arrestor so as to heat or cool the material exiting the container. Alternatively, the outlet channel and material exit manifold may be positioned at the top of the container, wherein the arrestor, retainer and other components of the vessel are appropriately configured.

The outlet channel 55 of the arrestor 73 at the false bottom 50 of the material vessel 20 leads to a material manifold 45. The material manifold may include a material inlet 48 and a material outlet 46 in a T-shape (tee). A flange 44 may be used to cap the bottom of the material manifold when formed in a T-shape. Alternatively, the material may enter and exit the manifold from the same port, wherein the manifold is formed in a L-shape. One or more valves (not shown) may be added to the material inlet and material outlet. Likewise, quick-release (cam and groove) couplings or other assemblies may be added to the material inlet and material outlet for connection to conventional devices for introducing (filling) and removing (emptying) material to/from the vessel.

Referring now to FIGS. 2 and 3, the force transfer device 60 includes a crown (upper portion) 68, a tangential member (middle portion) 69 and a thruster (lower portion) 71. In one embodiment, the crown is configured with a conical or frustum shape having a substantially triangular cross-section. The cone-shaped crown includes an access port (opening) 64 for access to a hollow interior of the force transfer device. The opening may be used to insert ballast or other weighted material into the thruster. A ballast plug (cap) 65 may be used to close the access port in the crown. One or more vents (gas ports) 66 may be drilled or otherwise formed in the crown and tangential member so as to allow gas to pressurize the internal space of the force transfer device. The force transfer device accepts the primary force and/or energy applied to the crown and transduces the applied force through the thruster, causing the material manifold 45 to be ubiquitously pressurized. When the transfer system 10 includes a stabilizing pipe or rod 62 or other central member, the crown also includes a hole or bore 75 at the vertex of the cone in which the stabilizing rod may be slidably disposed. Similarly, the thruster may be configured with an opening 77 at the vertex of the cone in which the stabilizing rod may be slidably disposed.

The thruster 71 may be formed in a conical or frustum shape having a substantially triangular cross-section and may be configured with a hollow interior. A tangential member 69 may be interposed between the conical crown 68 and the conical thruster. The tangential member may be configured as a disk or plate being circular or cylindrical in shape and rectangular in cross-section. The tangential member helps provide stability to the force transfer device such that the outer wall of the tangential member is configured to be positioned substantially parallel to the sidewall 24 of the vessel 20 and substantially parallel to the longitudinal axis of the crown and the longitudinal axis of the thruster.

As shown in FIG. 2, one embodiment of the force transfer device 60 includes a crown 68 and thruster 71 of conical shape, thereby forming a diconical force transfer device. In one embodiment, the crown is a hollow, upward-pointing cone, wherein the primary purpose is to prevent overfilling when the confined space of the vessel 20 is being filled with material 42. Of secondary importance and during the refilling process, the crown displaces any materials that may have deposited on top of the force transfer device. The conical thruster transfers the force applied to device so as to penetrate and move the material through the vessel's material outlet 55 and into the material manifold 45. The conical portion of the thruster is configured for penetrating the material in the vessel. Suitable materials of construction for the force transfer device and its components include metals (such as aluminum, copper, iron, nickel and titanium) and alloys (such as alloy 20, inconel, monel, steel and stainless steel). In addition, polymers, plastics, composites and other synthetic materials may be used to form the force transfer device, such materials include fiber reinforced plastic, polyethylene, PET, polypropylene, polytetrafluoroethylene, polyurethane, polyvinyl chloride, acrylonitrile butadiene styrene (ABS), chlorinated polyvinyl chloride (CPVC) and polyvinylidene fluoride (PVDF).

Referring again to FIG. 1, one embodiment of the refillable material transfer system 10 is configured with the material vessel 20 in a vertical position, wherein the bottom 26 of the container is adjacent to the floor or ground and may stand on legs or other pedestals (not shown). Accordingly, the sidewall 24 of the vessel holds the top 22 of the container in place. The force transfer 60 device is configured to move up and down the container as the material enters and leaves the vessel. When a stabilizer rod or other device 62 is disposed within the container, the transfer device moves up and down the rod, which may be configured with a cap 63 at the end of the rod near the bottom of the vessel. Movement of the force transfer device is constrained at the top of the vessel by the retainer 61, and is constrained at the bottom of the vessel by the arrestor 73. In one aspect of the present invention, the tangential member 69 is configured with an outer diameter that is less than the internal diameter of the vessel. Accordingly, as the transfer element moves up and down the container, a portion of material 42 remains along the sidewall forming a gas seal 49 between the vessel sidewall and the tangential member. In such a vertical configuration of the transfer system, the outlet 55 is configured with a sufficient vertical length so that gas in the vessel will not move through the outlet into the bottom material manifold as material empties from the container and the transfer element approaches the arrestor.

Figure 4:
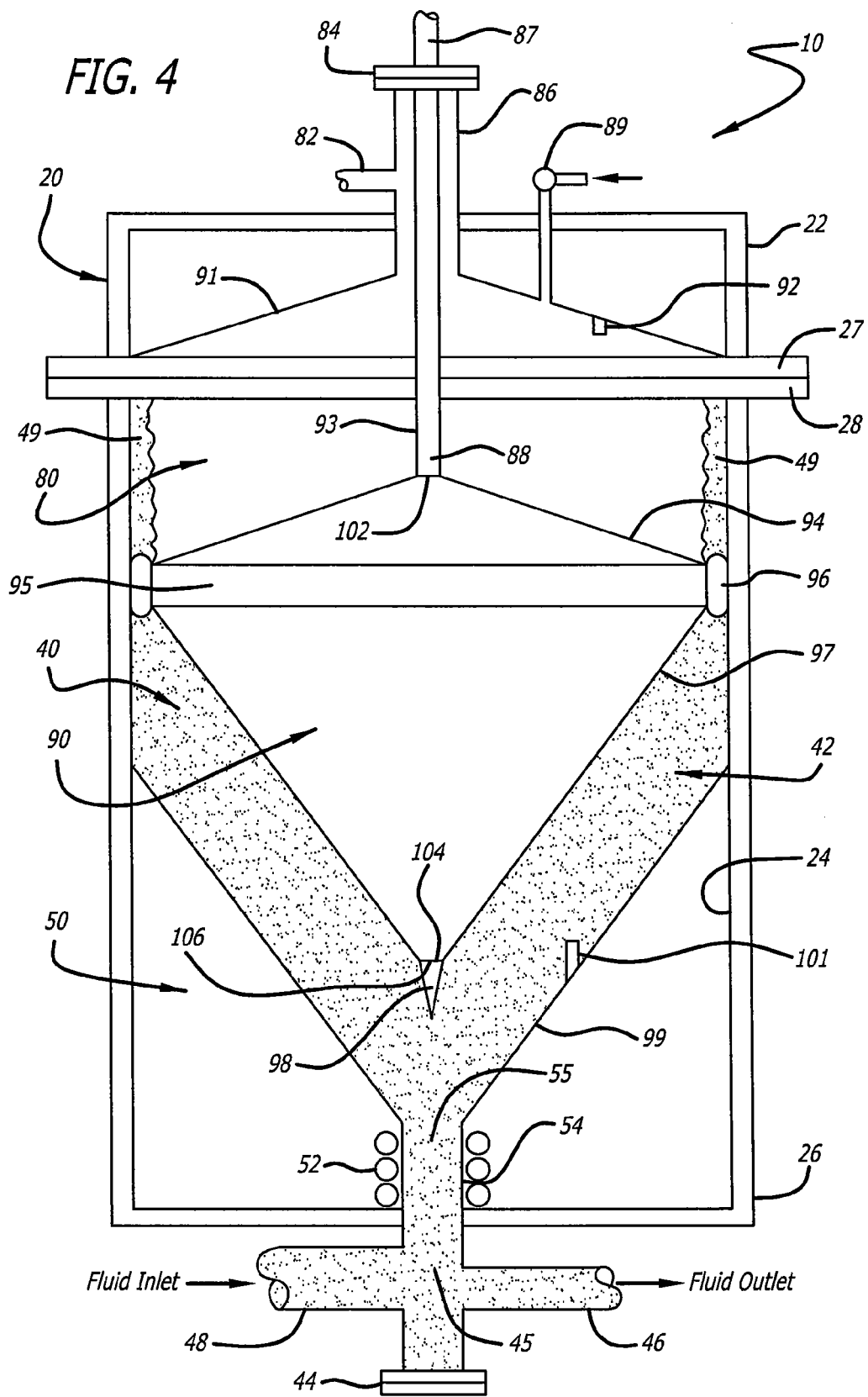
FIG. 4 is a front plan view in partial cross-section of an alternative embodiment of the refillable material transfer system of the present invention having a diconical force transfer device including stabilizers fins.

Referring now to FIG. 4, alternative embodiments of the refillable material transfer system 10 may be configured using a mode of force other than a high pressurized gas source. For example, a drive shaft 93 may be positioned within a manifold 86 configured within the top portion 22 of the material vessel (container) 20. The drive shaft is configured to provide a driving force so as to move a force transfer device 90 from the top to the bottom 26 of the vessel. A first end portion 87 of the drive shaft extends outside of the manifold from the top of the vessel. A flange 84 positioned at an end of the manifold that extends outside of the top of the vessel provides an airtight seal around the exterior portion of the drive shaft. A second end 88 of the drive shaft is disposed within an opening 102 configured at a vertex of a conical crown 94 of the force transfer device. Accordingly, movement of the drive shaft from the top towards the bottom of the container drives the force transfer device towards the bottom of the container. Likewise, movement of the drive shaft from the bottom towards the top of the container moves the force transfer device towards the top of the container.

In operation, it is expected that when material 42 enters the material manifold 45 positioned adjacent the bottom 26 of the vessel 20, then the force transfer device 90 rises towards the top 22 of the container. Alternatively, the drive shaft 93 may be configured to move the force transfer device to the top of the container adjacent a retainer 91 configured within the top portion or lid of the vessel. Further, a limit switch 92 may be configured in the retainer and electronically connected to the mode of force for the drive shaft so as to stop the force transfer device adjacent the retainer as the force transfer device approaches the top of the vessel. Similarly, a limit switch 101 may be positioned at or near the arrestor 99. Thus, as the drive shaft moves the transfer device towards the bottom of the container, the limit switch serves to stop the mode of force on the drive shaft and to position the transfer device adjacent the arrestor allowing essentially all of the material to be removed from the container. Alternatively, the material manifold, switches, retainer, arrestor and other vessel components may be configured so that the material is introduced and removed from the top of the container.

A gas purge line and valve 89 may be configured into the top or lid 22 of the vessel 20 and through the retainer 91 to allow air or an inert gas to be fed into the vessel when material 42 is being removed from the vessel and to purge such gases when the vessel is being filled with material. In addition, a material overfill arm 82 may be included in the manifold 86 for purging excess material, air and other gases during the fill cycle. The gas inlet and valve may be used to allow gas or air to enter into the container as material is moved out of the container as the airspace 80 increases within the container and as the material space 40 reduces in the container. Alternatively, the excess material discharge line 82 may be configured so as to allow air to enter and exit the container as the transfer device pushes material out of the container or material entering into the container moves the transfer device towards the top of the container.

Figure 5:
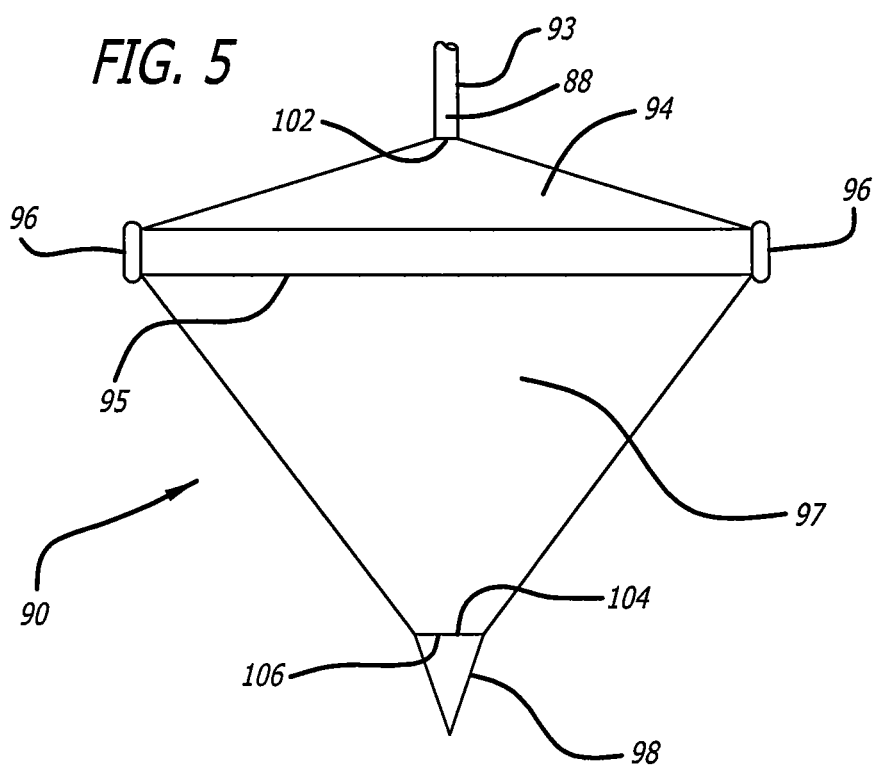
FIG. 5 is a side plan view of the force transfer device of FIG. 4.
Figure 6:
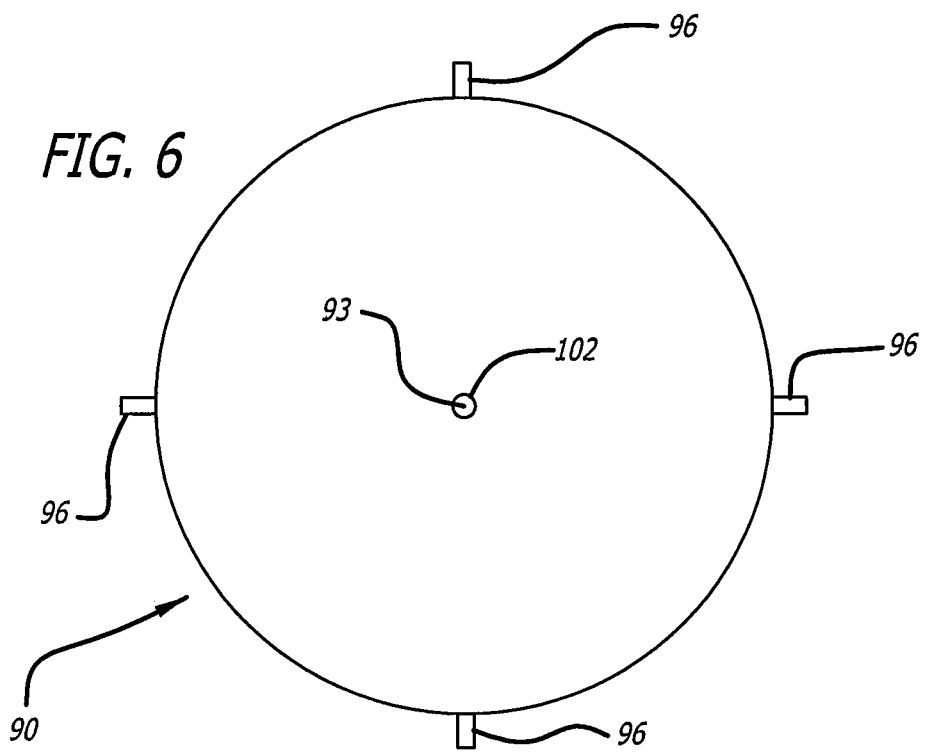
FIG. 6 is a top plan view of the force transfer device of FIG. 5.

Referring now to FIGS. 5 and 6, the diconical force transfer device 90 includes a crown (upper portion) 94, a tangential member (middle portion) 95 and a thruster (lower portion) 97. The crown and thruster are configured with a conical or frustum shape, having a substantially triangular cross-section with a truncated point or vertex. The annular tangential member has a substantially vertical outer surface, and is interposed between the crown and thruster. The crown, tangential member and thruster may be machined, die-cast or otherwise manufactured as a single unit, or may be manufactured as separate components and welded, bolted or otherwise permanently or removably fastened together to form the force transfer device.

The force transfer device 90 may be further configured with one or more stabilizers 96 positioned along the outer surface of the tangential member 95 of the transfer device. The stabilizers are thin blade-like members, and may be made of a similar material as the transfer device, for example, metals and their alloys, polymers, plastics, composites or other natural and synthetic materials. The plurality of stabilizers (for example, four stabilizers) may be affixed to the transfer device equidistant along the outer surface of the tangential member by welding, mechanical fasteners or other suitable devices and techniques. The top and bottom edges of the stabilizers may be rounded so as to limit scraping and other damage to the sidewall 24 of the material vessel 20. One purpose of the stabilizers is to help prevent tipping of the force device as the tangential member moves along the sidewalls of the vessel. The stabilizers also allow a material space 49 adjacent the sidewall of the vessel so as to provide a gas seal between the force transfer device and the vessel's sidewall. In such a configuration, the refillable material transfer system 10 may be used in a vertical position, a horizontal position or disposed at an angle as required by the user.

Performance of the force transfer device 90 may be enhanced by the addition of a penetrating tip or protuberance 98. As shown in FIGS. 4 and 5, the penetrating tip may be conical or frustum in shape, having the same or different intrinsic angle as the conical thruster portion 97 of the force transfer device (see FIG. 11). The penetrating tip may be made of the same material or alternative materials as the other components of the force transfer device. Further, the configuration of the conical thruster tip need not be triangular in cross-section, but may be rounded, square or other suitable configuration so as to help displace the material as the force transfer device moves towards the portion of the container that contains the material outlet channel 55 and material outlet manifold 45. The conical thruster may be configured at its bottom end (furthest from the crown 94 and tangential member 95) with a truncated portion 104 that is configured to receive the conical thruster tip. The wide end 106 of the conical thruster tip may be configured with a threaded flange or other device for securing to the truncated portion of the thruster. Alternatively, the conical thruster tip may be welded or otherwise permanently secured to the conical thruster. Empirical data supports the premise that the largest diameter of the thruster tip should be about the same as the diameter of the exit channel 55. Both the conical portion of the thruster and the protuberance are configured for penetrating the material.

Referring now to FIGS. 7 and 8, the force transfer device 90 may be further configured with an annulus management device 103 positioned adjacent and/or around the tangential member 95 of the force transfer device. For example, the annulus management device may include a circular, donut-shaped member that includes cutouts or notches (not shown) so as to fit tightly over the stabilizer fins 96. Alternatively, cutouts or notches could be made in the stabilizer fins to accommodate the annulus management device. The annulus management device also may be configured to be retained within an annular notch within the tangential member of the force transfer device. The annulus management device may be removably or permanently attached to the force transfer device (see also FIGS. 15, 16). The inner diameter of the annulus management device should be substantially the same as the outer diameter of the tangential member of the transfer device. The outer diameter of the annulus management device should be greater than the inner diameter of the material vessel 20 so as to be in close proximity to the sidewall 24 of the vessel. Thus, as the force transfer device moves along the sidewalls of the vessel, any accumulated material 49 (FIG. 4) along the sidewall of the vessel is moved towards the bottom 26 of the vessel, through the outlet channel 55 and preferably out the material manifold 45. Suitable materials for the annulus management device include materials similar to the force transfer device materials, as well as leathers, natural or synthetic rubbers and other elastomers such as Buna-N (nitrile), fluoroelastomers, neoprene and ethylene-propylene-diene-monomer (EPDM).

Figure 9:
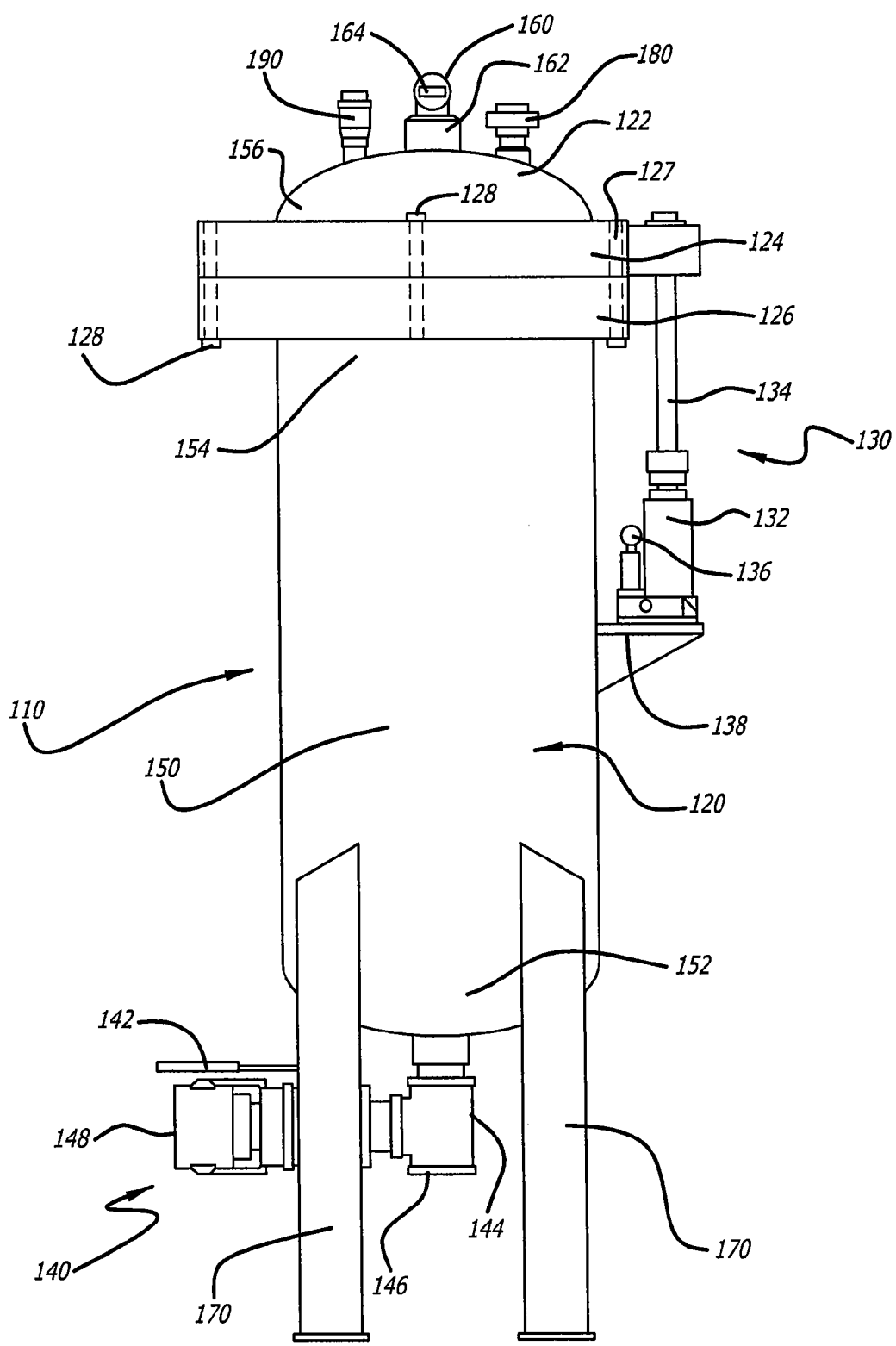
FIG. 9 is a side plan view in of an alternative embodiment of the refillable material transfer system of the present invention having a openable lid including a lift mechanism.

Referring now to FIG. 9, one embodiment of the refillable material transfer system 110 includes configuring the material vessel 120 in a vertical format. The material vessel includes a main body 150, a top 122, and one or more legs or extensions 170. The main body of the material vessel is configured in a cylindrical format having a lower portion 152 to be connected to the legs 170 and an upper portion 154 to be connected to the top 122. An upper annular flange 124 is connected to a lower portion 156 of the top. A lower annular flange 126 is connected to the upper portion 154 of the main body of the vessel. The annular flanges are essentially cylindrical in shape, having a donut-like configuration, being significantly larger in diameter than in thickness. Clamping screws 128 are secured to the bottom flange and are configured to reside within notches or slots 127 formed within the upper flange. The configuration of the top and bottom flanges and securing locks are such that when the securing locks are in place a fluid tight seal is maintained between the top and main body of the material vessel. Where the duty of the material vessel includes high pressure or other requirements for a fluid tight seal, an O-ring (not shown) may be interposed between the upper and lower flanges or a rubber or other polymeric coating may be applied to the upper and lower flanges so as to facilitate a fluid tight seal. Other mechanisms, such as latches, clamps, lifting lugs and davits may be used to secure the vessel's top to the vessel's main body.

The top portion 122 of the material vessel 120 may be hemispherical and circular in cross-section. Alternatively, the top of the pressure vessel may be configured flat, square or other suitable shape for the duty imposed on the vessel. Bores, cut outs or other access ports may be provided in the top of the container so as to facilitate positioning of a gas inlet and outlet valve 190, an overflow or pressure relief valve 180 and a gauge mechanism 160. For ease of insertion and removal of a gauge 160 having a display 164, a threaded coupling 162 may be placed within the center of the top portion of the container. Alternatively, the top coupling may be used to hold the stabilizer rod or pipe 62, as shown in FIG. 1, or the drive shaft 93, as shown in FIG. 4.

So as to facilitate removal of the top 122 from the container 120, a lifting mechanism 130 may be configured adjacent the main body 150 of the material vessel. In one embodiment, as available from Rosedale Products of Ann Arbor, Mich., U.S.A., a hydraulic jack 132 is used to drive a piston or rod 134 to lift the annular flange 124 of the top portion of the vessel. An actuator mechanism 136 may be used to hydraulically, mechanically or electro-mechanically move the drive shaft 134 to position the top of the container. Furthermore, the lifting mechanism may be configured so as to lift and allow horizontal movement of the lid without complete disengagement from the lower flange 126. For stabilizing purposes, a support flange 138 may be secured to the main body 150 of the material vessel and to the actuator mechanism 132 of the lift mechanism 130.

The refillable material transfer system 110 may be further configured with a material inlet and outlet manifold 140 positioned below the main body 150 of the material vessel 120 and adjacent the bottom portion 152 of the vessel. For example, a pipe 144 may be connected to the bottom portion of the container and may include a T-shaped (tee) portion 146 that is closed on one end and is connected to a discharge mechanism 148 on a second portion of the tee. The discharge portion of the material manifold may further include a ball valve and actuator mechanism 142. A cam and groove coupler or other industry specific mechanism may be configured on the outlet of the material manifold for coupling to hoses and pipes for filling and emptying the container. For further protection of the material discharge manifold, a shield (not shown) of plastic, metal or other suitable material may be configured around the legs 170 or other extension supporting the material container 120. Similarly, a protective shield (not shown) may be formed around the upper portion of the top 122 of the container so as to protect the display mechanism 160, gas inlet 190 and pressure relief or material discharge device 180. Cutouts in the protective mechanism surrounding the top may be provided for access to the display 164 and gas valve 190.

The refillable material transfer system 110 may be configured to hold various quantities of material 42 and various pressures of high-pressure gas 31. For example (see also FIGS. 1 and 4), the top 122 and main body 150 of the vessel 120 may be sized and the retainer 61, 91 and arrestor 73, 99 configured so that the internal material space 40 accommodates, for example, fifty-five, one-hundred-and-fifty, three-hundred or six-hundred gallons (2.3 cubic meters) of fluid or other material. For an operation mode involving constant gas pressure, those skilled in the art can determine, without undue experimentation, the volume of the container required to accommodate the high-pressure gas. For an operation mode involving pre-charging the vessel with a specific amount of gas proceed as follows:

(a) determine the final pressure (P), in absolute terms required to dispense the material when empty;

(b) multiply this absolute pressure (P) by the flooded volume (V) of the container to obtain a value referred to herein as the PV constant;

(c) determine the value of the absolute pressure at pre-charging a full container; and (d) divide the PV constant by the absolute pressure at pre-charging to determine the volume of the container required to accommodate the high-pressure gas.

When a diconical force transfer device 60, 90 is used in the material vessel 20, 120, the outer diameter of the tangential member 69, 95 (largest diameter of the crown 68, 94 and thruster 71, 97) is configured somewhat smaller than the inner diameter of the sidewall 24 of the material vessel. Refillable material transfer systems can be scaled up and down for the intended services. The services can range from small hand held systems to large cargo truck or trailer mounted systems. It is contemplated that the present invention is applicable to very small (micro-, nano-sized) to very large material transfer systems that would move material quantities of less than a micro-liter and at least tens of thousands of liters of material. Those skilled in the art of containers can determine, without undue experimentation, the appropriate container geometries, materials, and other features. Similarly, those skilled in the art of material transfer can determine, without undue experimentation, the appropriate force transfer device geometries, materials and other features. If refillable material transfer systems would be charged with finite volumes of gas, and not connected to a gas supplies, then those skilled in the art of materials transfer can determine, without undue experimentation, the appropriate minimum gas pressures. Further, those skilled in the art of gas handling can determine, without undue experimentation, the appropriate initial gas pressures and gas volumes. The following are the dimensions of some examples of refillable material transfer systems:

EXAMPLE NO. 1

Automotive Body Sealant Dispenser

Dispensing volume: 1.9 gallons (432 cubic inches, 7.1 liters)
Container
Top: flat
Bottom: flat
Inside Diameter: 6.5 inches (16.5 cm)
Inside height: 14.5 inches (36.8 cm)
Flooded volume: 2.1 gallons (481 cubic inches, 7.9 liters)
Material: aluminum
Force Transfer Device
Top: flat
Bottom: 120 degree cone
Bottom protuberance: none
Tangential diameter: 6.25 inches (15.9 cm)
Tangential height: 1.0 inches (2.5 cm)
Material: aluminum

EXAMPLE NO. 2

Automotive Body Sound Deadening Dispenser

Dispensing volume: 21.7 gallons (5,013 cubic inches, 82.1 liters)
Container
Top: 2:1 semi-ellipsoidal
Bottom: 2:1 semi-ellipsoidal
Inside Diameter: 15.5 inches (39.4 cm)
Straight shell height: 32.1 inches (81.5 cm)
Flooded volume: 34.3 gallons (7,929 cubic inches, 129.9 liters)
Material: stainless steel
Force Transfer Device
Top: 2:1 semi-ellipsoidal
Bottom: 2:1 semi-ellipsoidal
Bottom protuberance: diameter of 3.0 inches (7.6 cm) and height of 2.5 inches (6.4 cm)
Tangential diameter: 14.0 inches (35.6 cm)
Tangential height: 5.0 inches (12.7 cm)
Material: stainless steel Proximity of the tangential member 69, 95, 230, 232, 234, 236, 330, 332, 334, 346, 348 of the force transfer device 60, 90, 200 and 300 to the sidewall 24 of the material container 20, 120 is dependant, among other things, upon the nature of the material 42. The proximity can range from 0.2 to 1.0 inches (0.5 to 2.5 cm). Height of the tangential member 69, 95, 230, 232, 234, 236, 330, 332, 334, 346, 348 depends, among other things, upon the nature of the material and the size of the container 20, 120. Heights range from zero to twelve inches (30.5 cm). The conical crown 68, 94 has a defining angle which depends upon, among other things, the character of the material. The angle can range from 90 to 180 degrees. The fulcrum of the thruster 71, 97, 210, 212, 214, 215 has a defining angle 215 that depends, among other things, upon the nature of the material that can range from 90 degrees to 180 degrees. The thruster tip 98, 220 has a defining angle 225 that depends, among other things, upon the nature of the material that can range from 30 degrees to less than 180 degrees.

Figure 10:
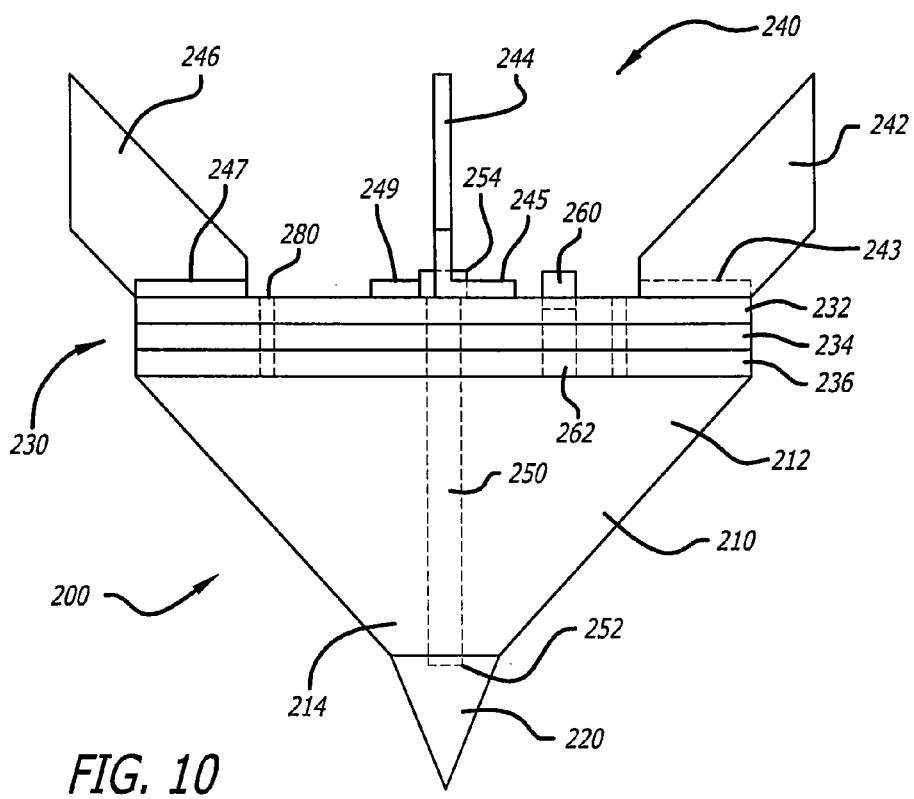
FIG. 10 is a side plan view in an alternative embodiment of the force transfer device of the present invention having upper stabilizers fins.
Figure 11:
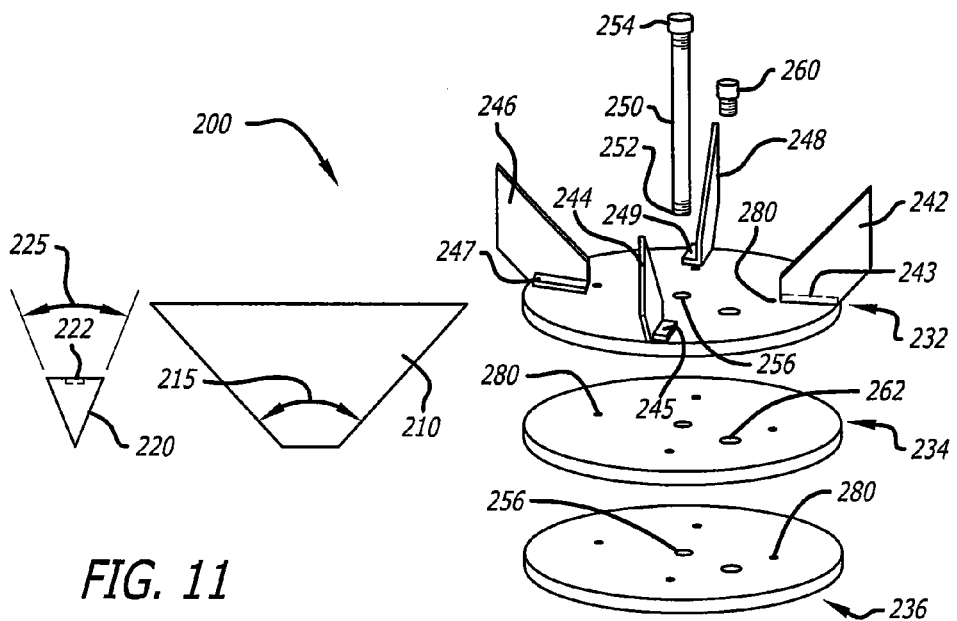
FIG. 11 is an exploded view of the components of the force transfer device of FIG. 10.

Referring now to FIGS. 10 and 11, the force transfer device 200 may be adapted for use with various fluids having different viscosities. The thruster portion 210 of the transfer device may be configured as conical or frustum shaped, hollow device. The plurality of tangential members 230 may be configured to be placed adjacent the thruster portion of the transfer device. For example, the tangential members 232, 234, 236 may be disk-like or cylindrical in shape having an aspect ratio where their height (thickness) is significantly less than their diameter. The tangential members may be stacked on top of each other and secured to the thruster portion using a securing rod 250 or other suitable mechanism. The securing rod may be removably attached to the plates using a top coupling 254, and may be secured at its second (bottom) end 252 to the bottom portion 214 of the conical thruster 210. In one embodiment, the securing rod is disposed in bores or holes 256 in the tangential members and within a pipe or conduit 258 in the thruster.

Penetration of the transfer device 200 into thick or viscous fluids may be aided by the addition of a penetration tip 220 attached to the lower portion 214 of the thruster 210. As heretofore described, the thruster tip may be conical (triangular in cross-section), blunted, square or other suitable shape. The thruster tip may include an adaptor 222 for attaching the tip to the thruster by welding, threading mechanisms or for fixing the tip to the securing rod 250. A port 264 in the conical thruster and lumens or holes 262 in the tangential members may be used to provide access to a hollow portion of the conical thruster for addition of ballast. A cap 260 may be placed on the outermost tangential member to cover the port for filling and removal of the ballast. When the force transfer device is used in a refillable material transfer system that is pressurized, holes or bores 280 may be drilled or otherwise formed into the tangential elements so as to allow pressurization of the material transfer device.

The force transfer device 200 may also include a stabilizer mechanism 240. For example, three stabilizing fins 242, 244, 246 may be secured to the outermost tangential member 232 to prevent tipping and otherwise stabilize the thruster 210 of force transfer device as it moves within the material vessel 20, 120. The stabilizer fins may be welded, bolted, screwed and permanently or removably fastened to the upper tangential member 232 of the force device by addition of one or more flanges 243, 245, 247. The stabilizer fins are configured such that they extend outside of the perimeter of the tangential members so that the outermost portion of the stabilizers are adjacent the inner sidewall of the material vessel. Alternatively, stabilizer fins may be attached to one or more of the tangential members as shown in FIGS. 4-6.

Figure 12:
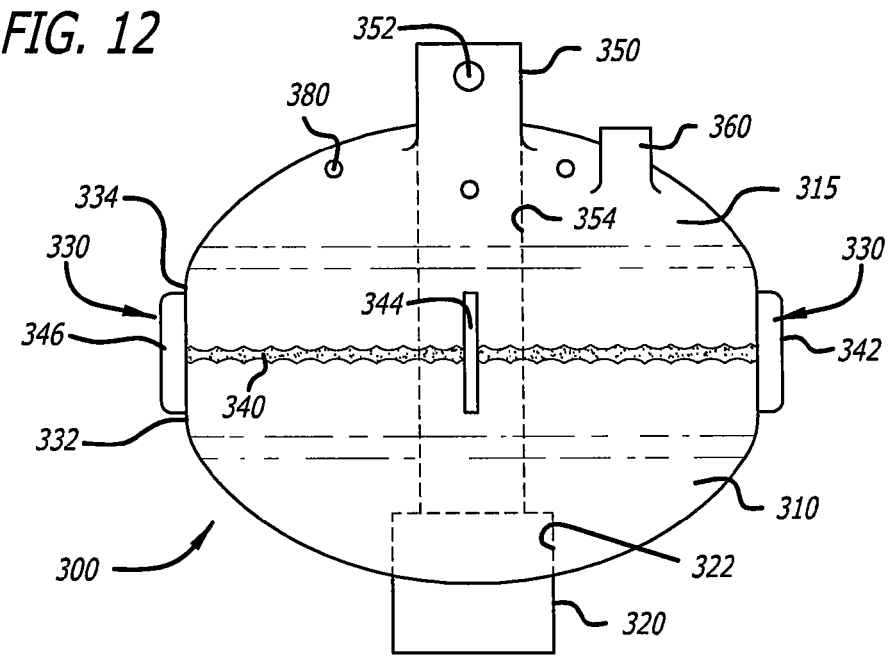
FIG. 12 is a side plan view in an alternative embodiment of the force transfer device of the present invention configured for use with a level indicating device.
Figure 13:
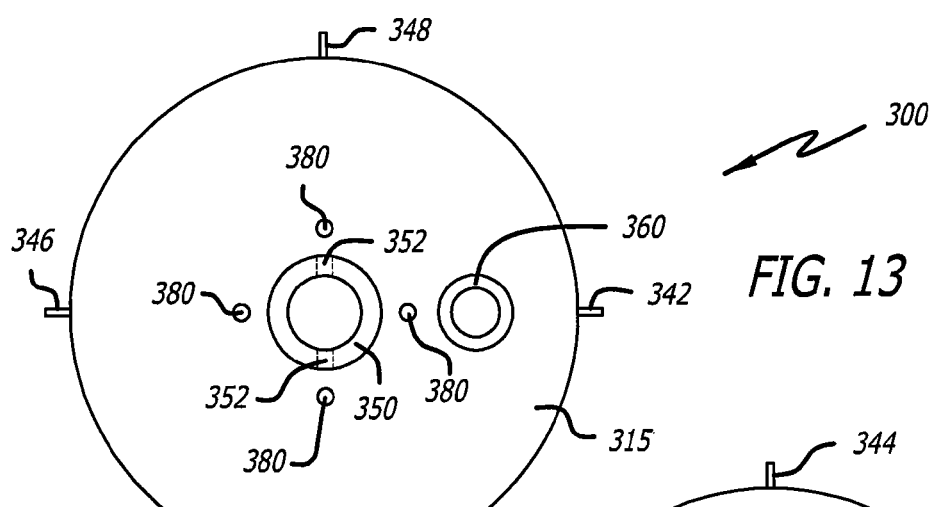
FIG. 13 is a top plan view of the force transfer device of FIG. 12.
Figure 14:
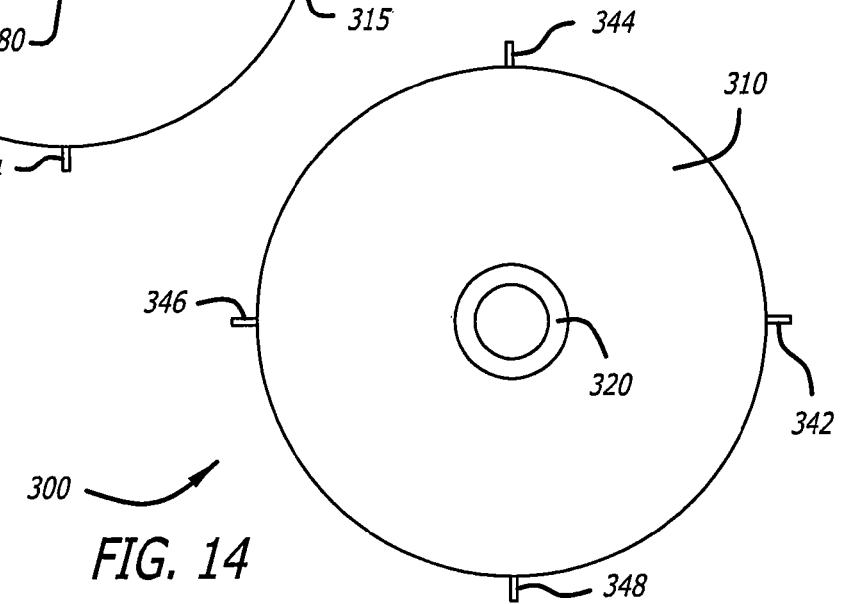
FIG. 14 is a bottom plan view of the force transfer device of FIG. 12.

Referring now to FIGS. 12, 13 and 14, the force transfer device 300 may be made in various configurations other than the diconical shape shown in FIGS. 1-8. For example, the thruster portion 310 of the transfer device and the crown portion 315 of the transfer device may be hemispherical or semi-elliptical in shape. Such hemispherical or elliptical shapes may be easier to manufacture through cold working, annealing, or casting. Similarly, injected molded processes for use of various alloys and metals may be implemented.

As shown in FIG. 12, the transfer device 300 may include a substantially tangential portion 330 so as to be parallel to the inner sidewalls of the material vessel. Accordingly, the thruster or lower portion 310 of the transfer device may include a tangential portion 332, and the upper portion 315 of the transfer device may include a tangential portion 334. The two halves of the transfer device may be joined at a weld 340 or other technique for permanently or removably fastening the two halves together may be employed. As heretofore described, vertical stabilizer fins 342, 344, 346, 348 may be spaced circumferentially around the tangential portion of the transfer device. Although four stabilizer fins are shown in the reference figures, two, three, six or more stabilizer fins may be employed as appropriate, depending on the diameter and other configurations of the vessel and transfer device.

When the force transfer device 300 is used in a gas-pressurized environment, the upper or top portion (crown) 315 of the transfer device may include one or more vents or holes 380 so as to allow the pressurized gas to enter the inside of the transfer device. In addition, an access port 360 for placing ballast into the transfer device may be provided on the upper surface of the transfer device crown. As heretofore described, the ballast access port may be configured to accept a plug or cap for removable insertion into the access port. The crown of the transfer device may also be configured with a coupling, flange or other member 350 for insertion of a stabilizer pipe 62 (FIG. 1) or drive shaft 93 (FIG. 4). For configurations of the force transfer device that accommodate a level indicating device (FIGS. 17, 18), a pipe or other tube may be configured to extend from the crown coupling to proximate the bottom surface of the thruster portion 310. As shown in FIG. 12, the thruster portion is also configured with a cylindrical protuberance or flange 320 that may be configured as a coupling to accept a retaining mechanism 322 that may be used to contain a position device subassembly 600 (FIG. 18). The thruster coupling may also serve as a penetrating tip to facilitate penetrating the material and for movement of very viscous fluids through the exit channel 55 and material manifold 45, 140 of the vessel 20, 120. Accordingly, the diameter of the thruster tip (protuberance 320) should be about the same as the diameter of the exit channel 55.

To aid in insertion and removal of the material transfer device 300 from the internals of a material vessel, holes 352 or similar mechanism may be formed in the upper coupling 350 on the crown 315. For example, as shown in FIG. 13, two holes 352 may be drilled in line across the coupling such that a chain or wire may be threaded through the holes to lift the force transfer device from the pressure vessel. As heretofore described, the transferred vessel may be made from any suitable metal, alloy, plastic or other polymer that would be compatible with the material to be used in the transfer system.

Figure 15:
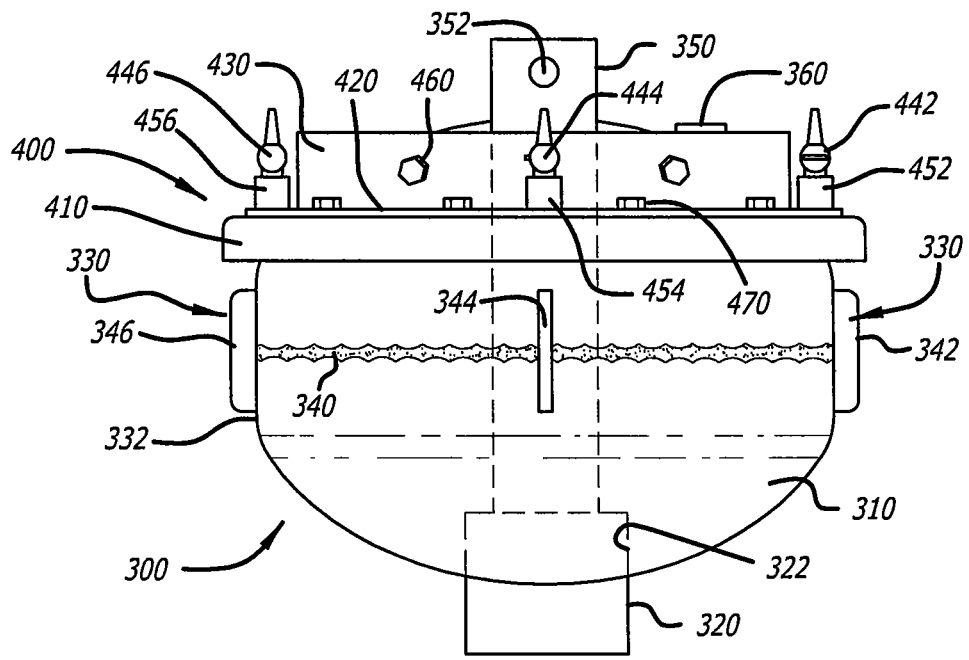
FIG. 15 is a side plan view of the force transfer device of FIG. 12, further including an annulus management device.
Figure 16:
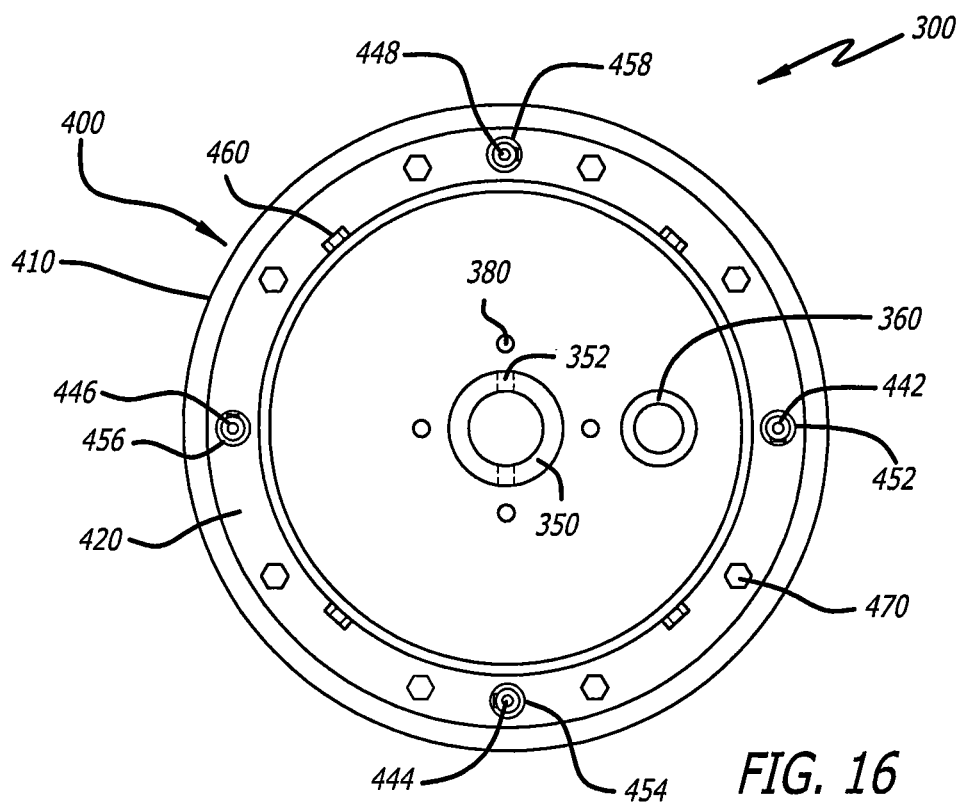
FIG. 16 is a top plan view of the force transfer device of FIG. 15.

Referring now to FIGS. 15 and 16, the hemispherical (semi-elliptical) transfer device 300 (FIG. 11) may be configured with an annulus management device 400 to help remove material accumulated on the inner sidewalls of the material vessel. The annulus management device includes an annular member 410 formed of natural or synthetic rubber, elastomeric polymers or other suitable materials compatible with the material being transferred in and out of the container. The annulus management device may further include a horizontal flange or flanges 420 affixed to the annular member. The horizontal flange may include ports 452, 454, 456, 458 to accommodate stop cocks 442, 444, 446, 448 or other venting mechanisms so that gas or air trapped below the transfer device may be released as the transfer device moves from the top to the bottom (from the first end to the second end) of the material vessel. The horizontal flange may be secured to the annular member by bolts and nuts 470 or other suitable fastening means. Alternatively, the annular member may be glued or otherwise bonded to the flange or directly to the crown of the transfer device. A vertical portion of the flange may be welded or otherwise formed with the horizontal flange and may be attached to the transfer device by bolts and nuts 460 or other suitable fastening means. The annulus management device may be fixedly or removably secured to the force transfer device.

Figure 17:
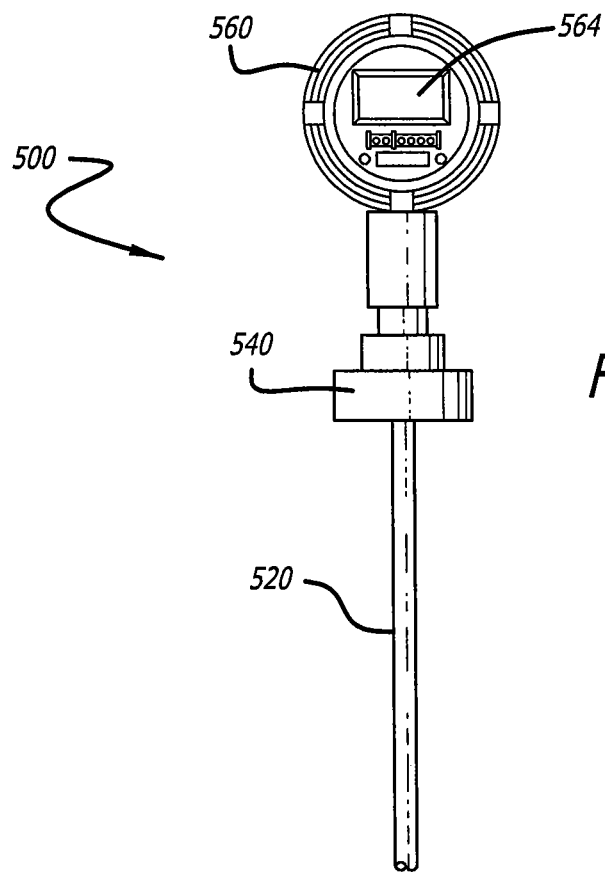
FIG. 17 is a side plan view of a level indicating device for use with the force transfer device of FIG. 12.
Figure 18:
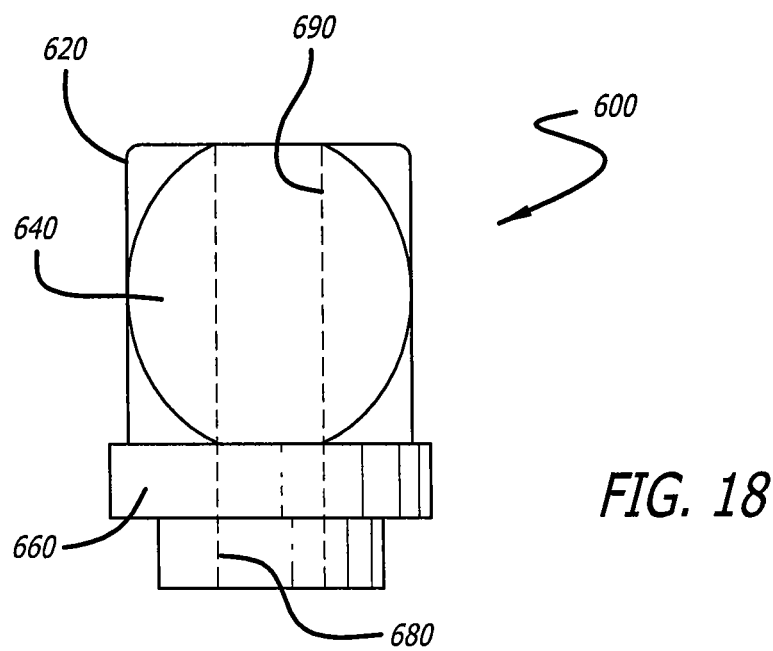
FIG. 18 is a side plan view of a position device subassembly for use with the force transfer device of FIG. 12 and the level indicating device of FIG. 17.

Referring now to FIG. 17, the refillable material transfer system may include a level indicating device 500. Many types of level indicators may be incorporated into the material transfer system, such as contact and non-contact level devices, for example for example, container weight devices (scales), container gas pressure devices (pressure gages), linear and rotary encoding devices (tape gages), wave devices (laser, magnetostrictive, radio frequency, and ultrasonic), magnetically coupled devices (indicating rods and tapes), displacement devices (limit and proximity switches), material flow devices (flow totalizers), optical devices (fiberoptic, photoelectric, and visual), gas and material interface devices (buoyancy, capacitance, conductivity, differential pressure, and differential temperature) and nuclear devices (radioisotope). One suitable system for use with the force transfer devices described herein is available from GEMS Sensors, Inc. of Plainville, Conn., USA. Such a device includes a stem 520 that may be disposed within the adapter pipe or central lumen of the force transfer device (see FIG. 12). The stem may include magnetic reed switches or other level indicators that are coupled to a microprocessor in a housing 560 that is visible from outside of the material vessel. A threaded coupling 540 or other securing device may be used to attach the level indicator system to the upper flange 350 of the force transfer device 300 shown in FIG. 12. The housing may include a programmable microprocessor (not shown) and other electronics such as a digital display 564 that may be configured for use with particular sizes of material vessels. The housing 560 of the system may be made of a polymer, composite, other synthetic material; or a more robust metal or alloy construction as available from Moore Industries International, Inc., of North Hills, Calif.

Referring now to FIG. 18, to actuate the magnetic sensors in the stem 520, a position device subassembly 600 may be configured for positioning within the force transfer device 300 shown in FIG. 11. The subassembly includes an outer housing 620 to contain a magnetic position device (magnetic actuator) 640, which may be cylindrical or egg-shaped. A threaded cap or other coupling 660 is configured on one side of the housing so as to be secured to an adapter 322 or other mechanism on the force transfer device. The housing cap includes a bore or lumen 680 so that the stem 520 may pass through the position device subassembly. Similarly, the position device is configured within a central lumen 690 so that the stem may be slidably disposed within the position device. Additionally, the position device subassembly may include a cleaning mechanism (not shown) to remove material deposits from the stem. In operation, as the material level increases in the vessel, the transfer device holding the position device subassembly (magnetic actuator) moves up the stem actuating the sensors contained within the stem. As the position device (magnetic actuator) approaches the highest point on the stem, then the display 564 on the device will be calibrated to read one-hundred percent or some other indication to show a full vessel. The level indicating device 500 may be calibrated to show material height, weight or volume as appropriate. Likewise, as the material is drained from the vessel, the transfer device approaches the bottom of the container causing the magnetic actuator to approach the lowest point on the stem and the level indicator will show a decrease in height, weight or volume of the material.

Figure 19:
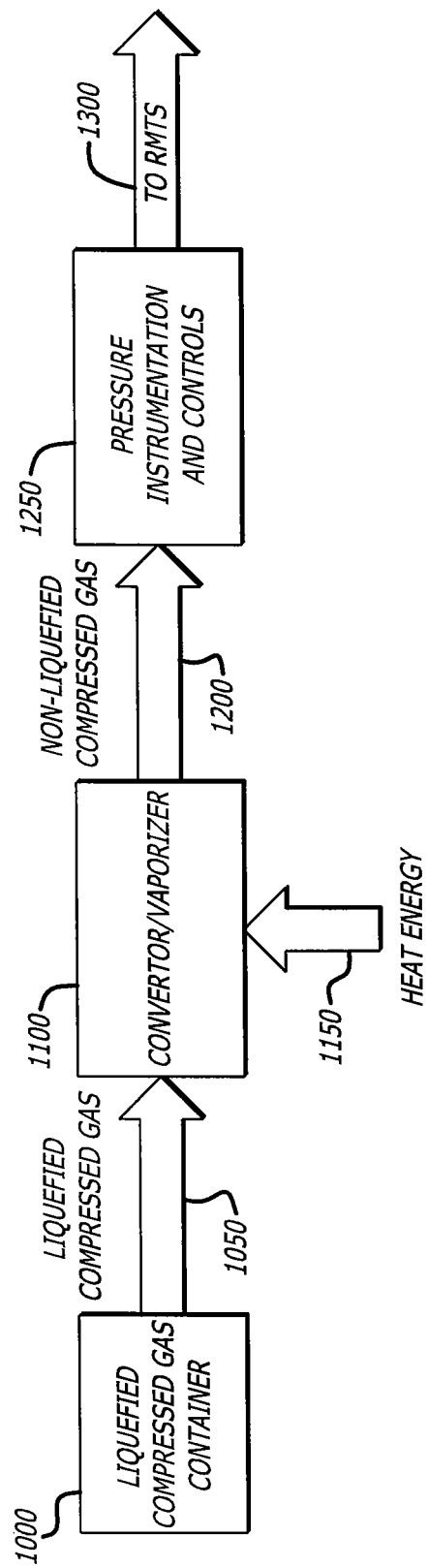
FIG. 19 is a flow diagram of the portable constant-pressure compressed gas subsystem of the present invention.

FIG. 19 is a flow diagram of the portable constant-pressure compressed gas subsystem of the present invention. A portable, constant-pressure container 1000 containing liquified compressed gas 1050 is coupled to a vaporizer 1100 to expand the gas for introduction into the RMTS system. Adding energy such as heat 1150, the vaporizer 1100 converts the liquified gas 1050 to a non-liquified compressed gas 1200, which then passes through a control device such as a pressure regulator 1250 with instrumentation and controls for regulating the pressure. The non-liquified gas at the constant, controlled pressure is then administered to the RMTS 1300 for use in the RMTS system for expelling the contents of the RMTS.

Figure 20:
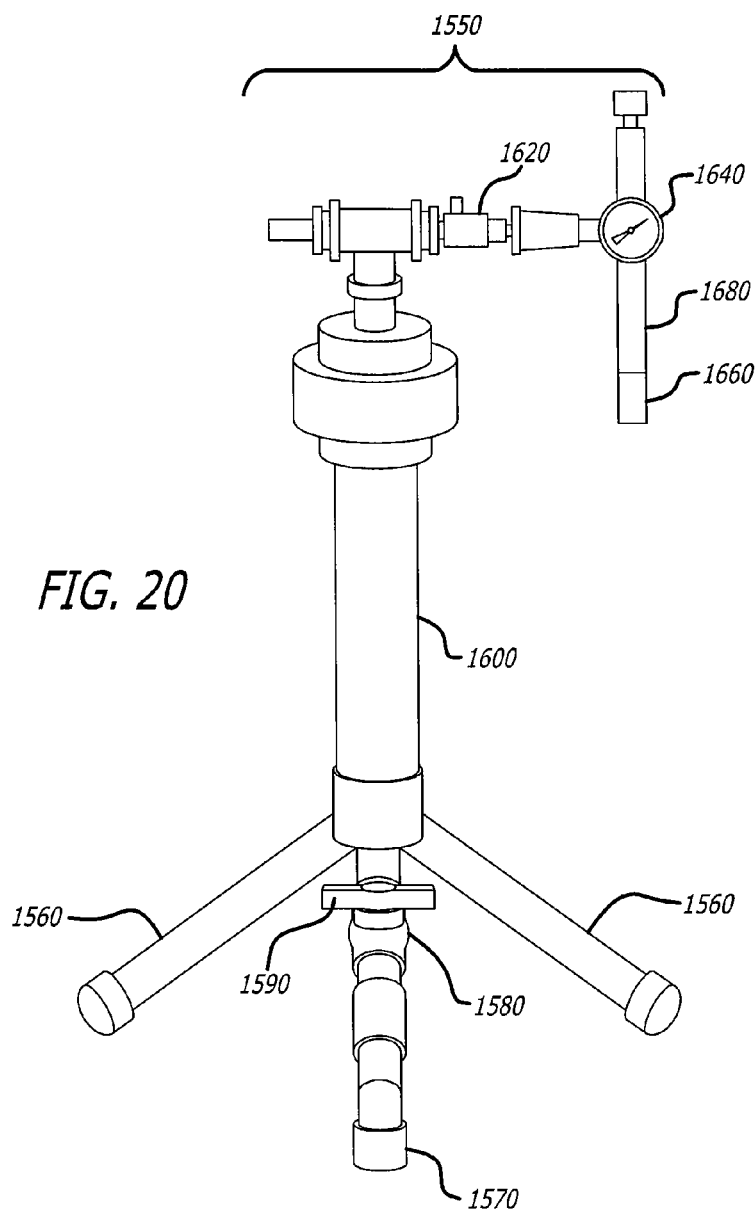
FIG. 20 is an elevated perspective view of a RMTS with portable constant-pressure compressed gas subsystem in accordance with the present invention.

FIG. 20 depicts a portable RMTS unit 1500 with portable constant-pressure compressed gas subsystem 1550. The portable RMTS unit 1500 includes legs 1560 that stabilize the unit and an inlet/outlet port 1570 having a control valve 1580 with a T-type manual actuator 1590 for opening and closing the valve 1580. The reservoir 1600 is similar to the pressure vessel 20 of FIG. 1 and the descriptions of the pressure vessel and force transfer device are not repeated here. The constant-pressure subsystem 1550 that provides the RMTS unit with a constant-pressure includes a gas inlet valve 1620 that is in fluid connection with, for example, a gas cartridge 1660 such as that available from Brass Eagle®, Crossman® Powerlet®, or Daisy® Powerline® twelve gram $CO_2$ Cartridge. Between the gas cartridge 1660 and the inlet valve 1620 is a converter/vaporizer 1680 for converting the liquified gas in the cartridge 1660 to a non-liquified gas as the designated pressure, and a pressure gauge 1640 that provides a readout of the applied pressure to ensure that the necessary pressure is present and the cartridge is sufficiently charged. The converter/vaporizer 1680 can utilize heat from its ambient surroundings to convert the liquified gas (such as by vaporization), or some other mode of energy can be used to convert the liquified gas to a non-liquified state. In a preferred embodiment, a pressure mechanism is connected to the converter/vaporizer 1680 to regulate the gaseous-phased material with a constant-pressure of a user-determined value. The subsystem 1550 also preferably includes a pressure control operably connected to the pressure mechanism for actuation and de-actuation thereof and for changing the value of constant-pressure into a different one.

The portable constant-pressure compressed gas system 1500 utilizes less expensive and more readily available consumer liquefied compressed gas containers, instead of more expensive and less readily available commercial and industrial non-liquified compressed gas cylinders, expanding the use of such systems by decreasing the necessary space requirements. This decreased space requirement is based on using higher mass-capacity liquefied compressed gas containers, instead of lower mass-capacity non-liquified compressed gas containers. These improved ergonomics are based on using smaller and lighter liquefied compressed gas containers, instead of larger and heavier non-liquified compressed gas containers.

Figure 21:
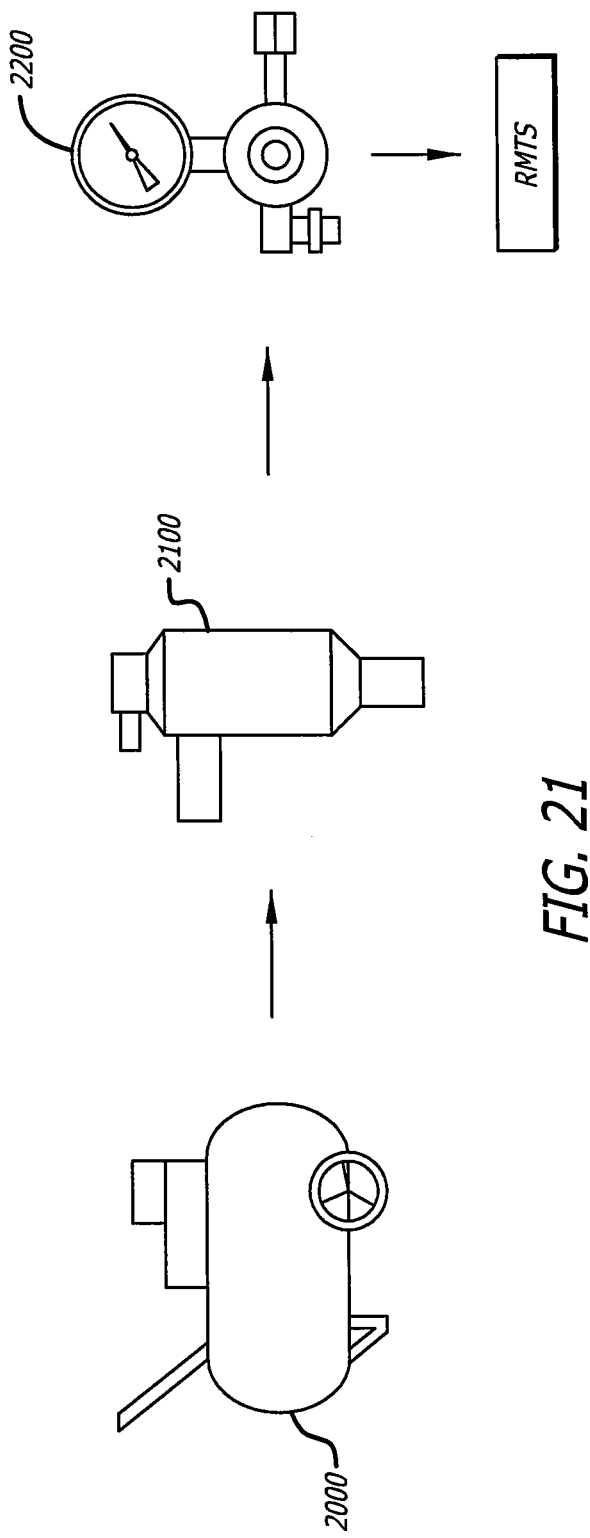
FIG. 21 is a schematic diagram of an alternative subsystem providing a source of constant-pressure compressed gas to the RMTS.

Alternately, as shown in FIG. 21 an air compressor 2000 with a surge vessel 2100 and a pressure regulator 2200 can be utilized to supply a constant-pressure to the RMTS. The air compressor 2000 can be a lightweight portable unit or a larger, more stationary unit that supplies pressurized gas, such as air, to the RMTS. In operation the compressor 2000 produces a pulsating output of air, where the pulsations fluctuate depending upon the conditions and the type of compressor. A surge vessel 2100 connected fluidly to the compressor is used to dampen the fluctuations in the compressor discharge, resulting in a more steady flow and attenuated noise. The pressure regulator 2200 is used to maintain the pressure of the compressed gas from the surge tank 2100 at the desired level before introducing the pressurized gas to the RMTS.

While particular forms of the invention have been illustrated and described with regard to certain embodiments of material transfer systems, it will also be apparent to those skilled in the art that various modifications can be made without departing from the scope of the invention. More specifically, it should be clear that the present invention is not limited to any particular method of forming the disclosed devices. While certain aspects of the invention have been illustrated and described herein in terms of its use with fluids and other specific materials, it will be apparent to those skilled in the art that the refillable material transfer system and force transfer device can be used with many materials not specifically discussed herein. Further, particular sizes and dimensions, materials used, and the like have been described herein and are provided as examples only. Other modifications and improvements may be made without departing from the scope of the invention. Accordingly, it is not intended that the invention be limited, except as by the appended claims.

We claim:

1. A refillable system for dispensing a material by a constant-pressure gas, the system comprising:
   (a) a vessel for containing and dispensing the material, having a first vessel end, an opposing second vessel end, and a circumferential sidewall extending therebetween, the first end having a gas inlet and the second end having a material outlet manifold, the vessel further having a longitudinal axis and a transverse width;
   (b) a subsystem for generating and supplying constant-pressure gas through the gas inlet, the subsystem comprising:
      a container for containing a gas material in a liquid phase,
      a converter for converting the liquid-phased gas material into a gaseous-phased material,
      a pressure mechanism connected to the converter for dispensing the gaseous-phased material with constant-pressure of a user-determined value as the constant-pressure gas, and
      a pressure control operably connected to the pressure mechanism for actuation and de-actuation thereof and for changing the value of constant-pressure into a different one,
      wherein the apparatus is in gaseous communication with the vessel for transmitting the constant-pressure gas thereinto through the gas inlet; and
   (c) a force transfer device disposed within the vessel for transferring force from the constant-pressure gas to the material in the vessel for dispensation thereof, the force transfer device comprising:
      a crown,
      a tangential member attached to the crown and having a longitudinal axis substantially parallel to the longitudinal axis of the vessel, wherein the tangential member is configured with an outer area substantially parallel to the longitudinal axis, wherein the tangential member has a transverse width substantial less than the transverse width of the vessel, and
      a thruster attached to the tangential member and configured to penetrate the material in the vessel,
      wherein the crown is configured to be pressed by the constant-pressure gas so as to push the thruster into the material in the vessel toward the second vessel end and to be dispensed out of the material outlet manifold.

2. The refillable system as in claim 1, further comprising a retainer positioned at the first vessel end and configured to conform to the shape of the crown.

3. The refillable system as in claim 2, further comprising an arrestor positioned at the second end of the vessel and configured to conform to the shape of the thruster.

4. The refillable system as in claim 1, wherein the container of the apparatus is of a portable size and replaceable.

5. The refillable system as in claim 4, wherein the container is configured to contain liquefied $CO_2$ gas.

6. The refillable system as in claim 1, wherein the converter of the apparatus uses the heat energy from ambient atmospheric air for converting the gas material from the liquid phase into the gaseous phase.

7. The refillable system as in claim 6, wherein the converter of the apparatus uses vaporization for converting the gas material from the liquid phase into the gaseous phase.

8. The refillable system as in claim 1, wherein the converter of the apparatus converts the gas material from the liquid phase into the gaseous phase at a temperature significantly lower than ambient atmospheric air temperature.

9. A refillable system for dispensing a material by a constant-pressure gas, the system comprising:
   (a) a vessel for containing and dispensing the material, having a first vessel end, an opposing second vessel end, and a circumferential sidewall extending therebetween, the first end having a gas inlet and the second end having a material outlet manifold, the vessel further having a longitudinal axis and a transverse width;
   (b) a subsystem for generating and supplying constant-pressure gas through the gas inlet, the subsystem comprising:
      an air compressor for supplying pressure gas material to the vessel,
      a surge tank in fluid communication with said air compressor for dampening fluctuations of said air compressor; and
      a pressure regulator connected to the surge tank for controlling the pressure gas;
      wherein the subsystem is in gaseous communication with the vessel for transmitting the constant-pressure gas thereinto through the gas inlet; and
   (c) a force transfer device disposed within the vessel for transferring force from the constant-pressure gas to the material in the vessel for dispensation thereof, the force transfer device comprising:
      a crown,
      a tangential member attached to the crown and having a longitudinal axis substantially parallel to the longitudinal axis of the vessel, wherein the tangential member is configured with an outer area substantially parallel to the longitudinal axis, wherein the tangential member has a transverse width substantial less than the transverse width of the vessel, and
      a thruster attached to the tangential member and configured to penetrate the material in the vessel,
      wherein the crown is configured to be pressed by the constant-pressure gas so as to push the thruster into the material in the vessel toward the second vessel end and to be dispensed out of the material outlet manifold.

* * * * *